(12) United States Patent
Fulop

(10) Patent No.: US 10,737,377 B2
(45) Date of Patent: Aug. 11, 2020

(54) SYSTEMS, DEVICES, ARTICLES, AND METHODS FOR ROBOTS IN WORKPLACES

(71) Applicant: Kindred Systems Inc., Vancouver (CA)

(72) Inventor: Douglas Ian Fulop, San Francisco, CA (US)

(73) Assignee: KINDRED SYSTEMS INC., San Francisco, CA (US)

( * ) Notice: Subject to any disclaimer, the term of this patent is extended or adjusted under 35 U.S.C. 154(b) by 439 days.

(21) Appl. No.: 15/460,057

(22) Filed: Mar. 15, 2017

(65) Prior Publication Data

US 2017/0269607 A1 Sep. 21, 2017

Related U.S. Application Data

(60) Provisional application No. 62/308,656, filed on Mar. 15, 2016.

(51) Int. Cl.
| | |
|---|---|
| B25J 9/16 | (2006.01) |
| B25J 5/00 | (2006.01) |
| B25J 9/00 | (2006.01) |
| B25J 19/02 | (2006.01) |
| B25J 13/00 | (2006.01) |
| B25J 13/08 | (2006.01) |
| B25J 13/02 | (2006.01) |

(52) U.S. Cl.
CPC ............ B25J 5/007 (2013.01); B25J 9/0006 (2013.01); B25J 9/0087 (2013.01); B25J 13/006 (2013.01); B25J 13/025 (2013.01); B25J 13/084 (2013.01); B25J 19/023 (2013.01); Y10S 901/01 (2013.01)

(58) Field of Classification Search
CPC .. B25J 5/007; B25J 9/16; B25J 9/1689; Y10S 901/01; G05D 1/0287; G05D 2201/0216; B65G 1/023; G05B 2219/39212; G05B 2219/35472
USPC ................. 700/245, 248, 257, 253; 701/23; 318/568.17
See application file for complete search history.

(56) References Cited

U.S. PATENT DOCUMENTS

| | | | |
|---|---|---|---|
| 2,476,249 A | 7/1949 | Payne, Jr. | |
| 2,846,084 A | 8/1958 | Goertz et al. | |
| 3,923,166 A | 12/1975 | Fletcher et al. | |
| 4,046,262 A | 9/1977 | Vykukal et al. | |
| 5,116,180 A | 5/1992 | Fung et al. | |
| 8,704,832 B2 | 4/2014 | Taylor et al. | |
| 9,656,387 B2 * | 5/2017 | Mian .......................... | B25J 9/16 |
| 9,799,198 B2 * | 10/2017 | Tan ........................ | G08B 21/18 |
| 2013/0218340 A1 * | 8/2013 | Hager .................... | B25J 9/1671 |
| | | | 700/257 |
| 2015/0217449 A1 * | 8/2015 | Meier .................... | B25J 9/1602 |
| | | | 700/257 |

(Continued)

OTHER PUBLICATIONS

Anderson, "Autonomous, Teleoperated, and Shared Control of Robot System," 1996 *IEEE International Conference on Robotics and Automation*, Apr. 22-28, 1996, Minneapolis, MN, 9 pages.

(Continued)

*Primary Examiner* — Dalena Tran
(74) *Attorney, Agent, or Firm* — Seed Intellectual Property Law Group LLP

(57) ABSTRACT

Systems, devices, articles, and methods as disclosed, described, illustrated, and claimed herein. The systems, devices, articles, and methods generally relates to the field of robotics.

20 Claims, 14 Drawing Sheets

(56) References Cited

U.S. PATENT DOCUMENTS

2018/0361586 A1* 12/2018 Tan .......................... B25J 9/16

OTHER PUBLICATIONS

Brooks et al., "Hand Controllers for Teleoperation : A State-of-the-Art Technology Survety and Evaluation," NASA Jet Propulsion Laboratory, Pasadena, CA, 1985, 97 pages.

Crandall et al., "Characterizing Efficiency of Human Robot Interaction: A Case Study of Shared-Control Teleoperation," *IEEE/RSJ International Conference on Intelligent Robots and Systems*, Sep. 30-Oct. 4, 2002, Lausanne, Switzerland, 11 pages.

Dragan et al., "Teleoperation with Intelligent and Customizable Interfaces," *Journal of Human-Robot Interaction* 2(2):33-57, 2013.

Espiau et al., "A New Approach to Visual Servoing in Robotics," *IEEE Transactions on Robotics and Automation* 8(3):313-326, 1992.

Everett et al., "Controlling Multiple Security Robots in a Warehouse Environment," *Conference on Intelligent Robots in Factory, Field, Space, and Service*, Mar. 21-24, Houston, TX, pp. 93-102.

Groover et al., "A Survey of Robotics Technology in Construction," ATLSS Report No. 87-04, Lehigh University, 1987, 70 pages.

Hokayem et al., "Bilateral Teleoperation: An Historical Survey," *Automatica* 42(12):2035-2057, 2006.

Inaba, "Remote-Brained Robots," *IJCAI'97 Proceedings of the Fifteenth International Joint Converence on Artificial Intelligence*—vol. 2,Nagoya, Japan, Aug. 23-29, 1997, pp. 1593-1606.

Labonté et al., "Comparative Analysis of 3D Robot Teleoperation Interfaces with Novice Users," *IEEE Transactions on Systems, Man, and Cybernetics, Part B* 40(5):1331-1342, 2010.

Oboe et al., "A Design and Control Environment for Internet-Based Telerobotics," *The International Journal of Robotics Research* 17(4): 23 pages, 1998.

Reinoso et al., "Mechanisms for collaborative teleoperation with a team of cooperative robots," *Industrial Robot: An International Journal* 35(1):27-35 2008, 13 pages.

Sheridan, "Teleoperation, Telerobotics and Telepresence: A Progress Report," *Control Eng. Practice* 3(2):205-214, 1995.

* cited by examiner

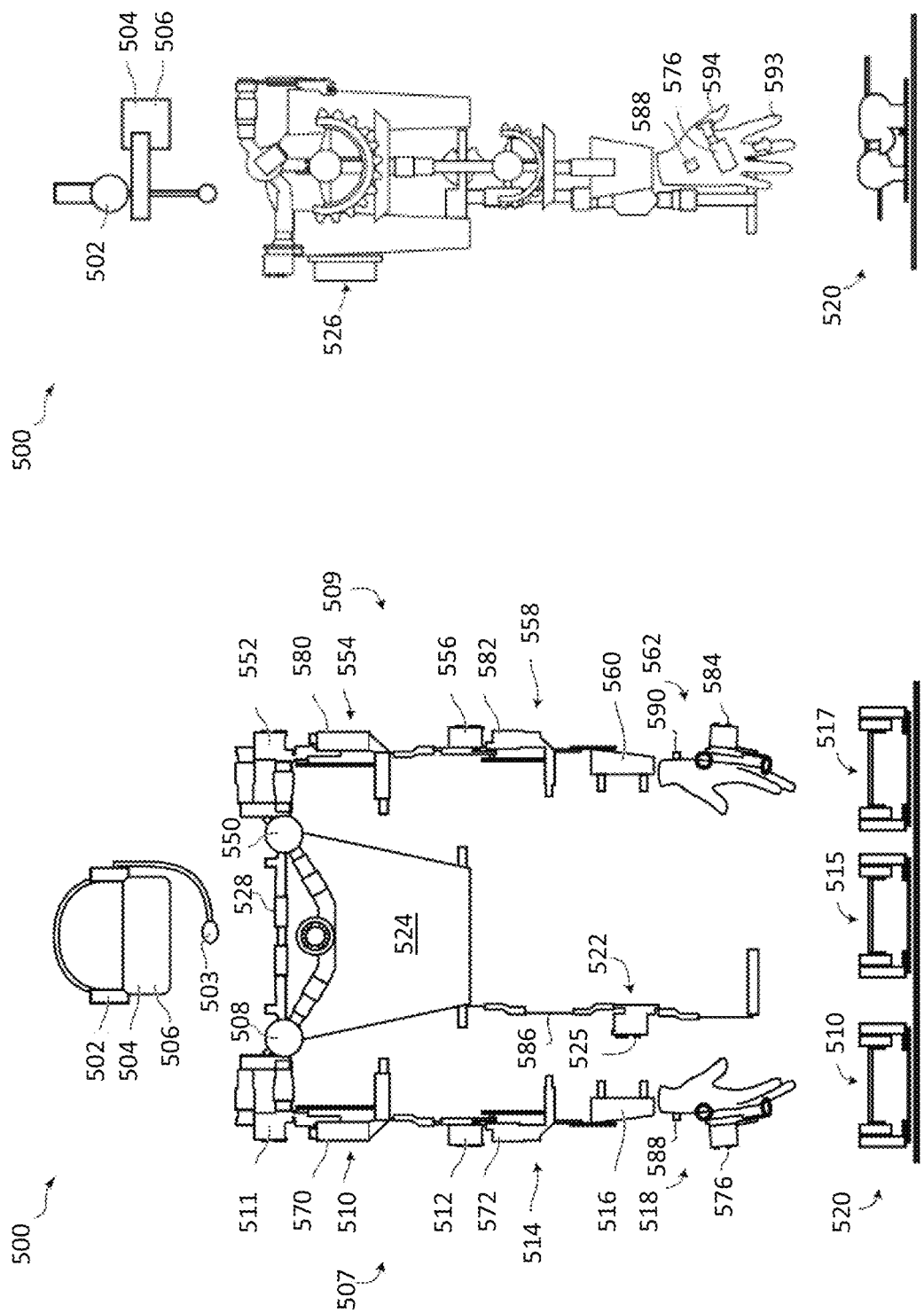

SYSTEMS, DEVICES, ARTICLES, AND METHODS FOR ROBOTS IN WORKPLACES

BACKGROUND

Technical Field

This disclosure generally relates to the field of robotics.

Description of the Related Art

Machine Learning

A computer, which is a machine, can perform or succeed at one or more related tasks as defined by a measure. The computer learns, if after exposure to information characterizing an event, the computer improves under the measure at performing the one or more related tasks. Further, the computer learns without updates to any processor-executable instructions by imperative programming.

Robots

A robot is an electro-mechanical machine controlled by circuitry and/or a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled or control switches between autonomous and operator controlled modes. As well, a robot includes computational resources to preform computational tasks. The computational tasks can be in aid of the physical tasks.

BRIEF SUMMARY

A robot may be summarized substantially as described and illustrated herein.

A system may be summarized as including a robot substantially as described and illustrated herein.

A method of operation in a robotic system may be summarized substantially as described and illustrated herein.

A tangible computer readable storage medium may be summarized substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings. Systems, devices, articles, and methods are described in greater detail herein with reference to the following figures in which:

FIGS. 5A and 5B are elevation front and elevation side views, respectively, illustrating an exemplary operator interface;

DETAILED DESCRIPTION

Figure 1:
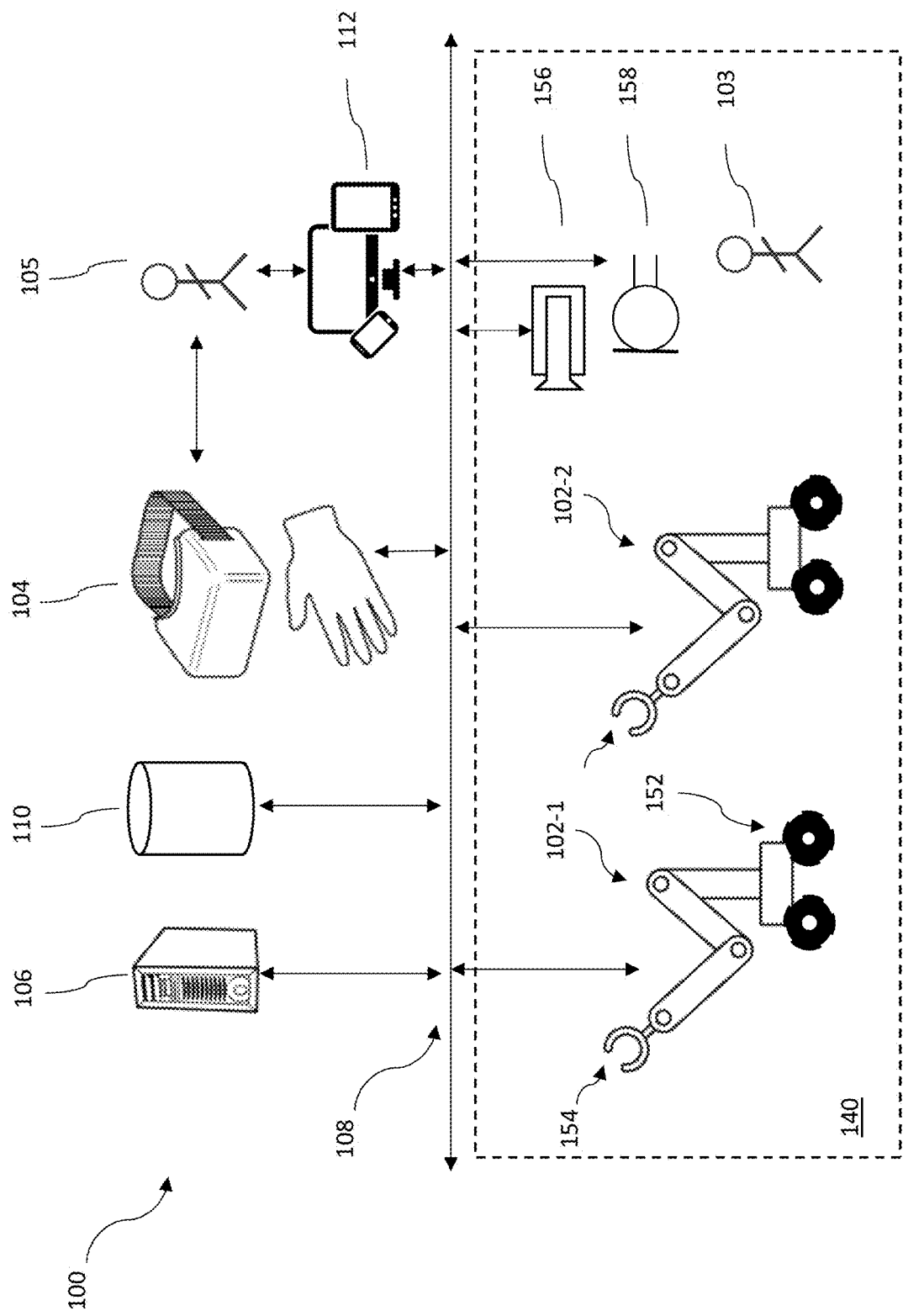
FIG. 1 is a schematic diagram illustrating a portion of a system including a robot, and an operator interface.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with machine learning and/or robotics, such as processors, sensors, storage devices, and network interfaces, have not been shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example," or "implementation", means that a particular referent feature, structure, or characteristic described in connection with the embodiment, example, or implementation is included in at least one embodiment, example, or implementation. Thus, the appearances of the phrases "in one embodiment", "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the user forms "a", "an", and "the" include plural referents unless the content clearly dictates otherwise. Thus, for example, reference to a system including "a computer server" includes a single computer server, or two or more computer servers. It should also be noted that the term "or" is generally employed in its sense including "and/or" unless the content clearly dictates otherwise.

The headings provided herein are for convenience only and do not interpret the scope or meaning of the embodiments.

Robots have a place in the operation of a supply chain for example in a warehouse, and in order fulfillment. Task that a human worker in a warehouse performs may be broken down into sub-tasks. Applicants note a robot can multi-task in the ways that are different from a human worker. Applicants note at present to be judged useful an autonomous robot should perform all subtasks of a task. It is unfeasible to swap a robot and a human for one sub-task. However, Applicants note that a tele-operated robot can move operator controlled to user controlled mode or the reverse. Applicants propose systems, devices, articles, and methods to operate robots within work environments including warehouse environments and order fulfillment environments, and switch one or more robots to (or from) a piloted mode from (or to) an autonomous more for one or more tasks in a pipeline of tasks.

FIG. 1 shows an exemplary system 100. Various components of system 100 are optional. As shown, the system 100 includes one or more robots 102, one or more operator interfaces 104, and one or more computers (e.g., processor-based computer systems) 106, all communicatively coupled via one or more network or non-network communication channels 108. The system 100 can include one or more nontransitory computer- and processor-readable storage devices 110 which store processor-executable instructions and/or processor-readable data. While illustrated separately from the computer 106, in at least some implementations the nontransitory computer- and processor-readable storage device(s) 110 can be an integral part or component of the computer 106.

The system 100 can include one or more user interface devices 112. The one or more user interface devices 112 includes one or more input and output devices such as keyboards, mice, touch displays, displays (e.g., LCD or OLED screen), and the like. The one or more user interface devices 112 may be devices in different form factors, such as, personal computer, tablet, (smart) phone, wearable computer, and the like. A person could operate or utilize user interface devices 112 to monitor a robot, request one or more robots be delivered to a workplace, and the like.

Operator interface 104 includes one or more input devices to capture motion or actions of a human operator. Operator interface 104, an example of user interface, can include one or more user input devices, including those described herein, and one or more user output devices, for instance a display (e.g., LCD or OLED screen), head mounted display, speaker, and/or haptic feedback generator (e.g., vibration element, piezo-electric actuator, rumble motor).

Examples of computer 106 are described herein. Computer 106 may facilitate or coordinate the operation of system 100. Computer 106 could be a processor-based computer system. The processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. Computer 106 may include a control subsystem including at least one processor. The at least one processor or the control subsystem or computer 106 may be referred to as a controller.

Examples of a suitable network or non-network communication channel 108 include a wire based network or non-network communications channels, optical based network or non-network communications channel, wireless network or non-network communications channel, or a combination of wired, optical, and/or wireless networks or non-network communications channels.

System 100 can include one or more robots 102-1, 102-2 (collectively 102), and the like. A human operator 105 may pilot at least one of the one or more of robots 102, for example via operator interface 104. Robots 102 operate in, and receive data about, an environment 140 that comprises a physical space.

A robot, like one of robots 102, is an electro-mechanical machine controlled by circuitry and/or one or more processors executing processor-executable instructions. One or more robots 102 can be controlled autonomously, for example via an on-board or a remote processor executing processor executable instructions, typically based on some sensed input data (e.g., processed machine-vision information, information representing a level of force or weight sensed by a transducer, information representative of a distance traveled, for instance optical encoder information). One or more robots 102 can be controlled by a human operator. One or more robots 102 can be controlled by another machine, including another robot; or the like. In some instances, a robot 102 may be controlled autonomously at one time, while being controlled by a human operator at another time. That is, operate under an autonomous control mode and change to operator under a piloted mode. See examples of changing modes are illustrated and described herein at least in relation to FIGS. 10, 11, and 12. In some instances, robot 102 may be partially controlled autonomously (e.g., first subset of functions) while at the same time being controlled by a human operator (e.g., second subset of functions).

A robot performs physical tasks, for example, performing work with tangible results and/or performs computational tasks. A robot has the ability to move at least a portion of the robot in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be included as a component in a larger system, for instance system 100.

Robots 102 operate in, and receive data about, an environment 140 that comprises a physical space. Robots 102 receive data from one or more sensors such as environmental sensors or internal sensors. Environmental sensors provide data that represents one or more aspect of the environmental conditions for the robots 102. The internal sensor information represents information about the internal state of a robot. For example, the internal sensor information represents a level of an internal power supply (e.g., battery, energy source, fuel cell, fuel, or the like).

One or more of robot(s) 102 may be human operator controllable robots (i.e., piloted), autonomous robots, and hybrid robot (i.e., partially autonomous, partially piloted). A human operator, at operator interface 104, may pilot at least one of the one or more of robots 102, for example via operator interface 104. Alternatively, a robot may act autonomously (i.e., under its own control). In a human operator controlled (or piloted) mode, the human operator observes representations of sensor data—for example, video, audio or haptic data received from one or more environmental sensors or internal sensor. In some implementations, the robot is perceived directly by the human without the aid of artificial sensors. The human operator then acts, conditioned by a perception of the representation of the data, and creates information or executable instructions to direct the at least one of the one or more of robots 102. Robot(s) 102 may operate in response to and/or by executing instructions generated or principally generated at an operator interface, for example, operator interface 104. For example, a robot, in piloted mode, would execute instructions that cause the robot to simulate actions taken by a human operator at an operator interface.

Alternatively a robot may act autonomously. Robot(s) 102 may operate in an autonomous mode executing autonomous control instructions. At least one processor, e.g., a processor in robot(s) 102 or computer 106, generates processor executable instructions, which when executed, cause at least one of robots 102 to act, e.g., move, manipulate an item.

Robot(s) 102 may be selectively operable in an autonomous mode, or operable in a piloted mode by a human operator via an operator interface. Robot(s) 102 may operate in a hybrid manner where the robot is in piloted mode for one or more tasks in a pipeline of tasks and is in autonomous mode for one or more tasks in the pipeline. Control of a robot can pass from autonomous mode to piloted mode (or the reverse) during a pipeline of tasks.

A robot, like one of robots 102, may operate in communication with communication channel(s) 108, for example, be communicatively coupled to. Robots 102 may send and/or receive processor readable data or processor executable instructions via communication channel(s) 108. Robots 102 interact with one or more user interfaces. Operator interface 104 receives and/or sends processor-readable data or -executable instructions across communication channel(s) 108. Operator interface 104 creates or provides human readable representations of processor readable instructions.

One or more human workers 103 (only one illustrated) may work or otherwise inhabit the environment 140. The environment 140 can, for example, take the form of a warehouse and the worker(s) 103 may engage in warehouse work. Alternatively, the environment 140 can, for example, take the form of a retail location, and the worker engages in work such as stocking shelves, refrigerated displays or cases, or produce displays, counters or cases. Worker 103 differs from operator 105 in that worker 103 is local to robots 102, while operator 105 may or may not be local to the robots 102. Worker 105 may interact with user interface 112. In some implementations, worker 103 and human operator 105 may be the same person.

A robot 102 typically includes a propulsion or motion subsystem comprising of one or more motors, solenoids or other actuators, and associated hardware (e.g., drivetrain, wheel(s), treads), to propel the robot in a physical space. An example of a propulsion or motion subsystem is wheels, drive train, and motor 152. The space does not need to be horizontal or terrestrial. Examples of spaces include water, air, vertical spaces, outer space (i.e., outside the Earth's atmosphere), and the like.

A robot includes a manipulation subsystem comprising one or more appendages, such as, one or more arms and/or one or more associated end-effectors also referred to as end arm tools, such as, arm and end-effector 154. An end-effector or end of arm tool is a device attached to a robotic arm designed to interact with the environment. End-effectors for robot operating in unstructured environments are devices of complex design. Ideally, these are capable of performing many tasks, including for example grasping or gripping or otherwise physically releasably engaging or interacting with an item (e.g., article, object, workpiece).

While system 100 is illustrated with two robots 102, one operator interface 104, one computer 106, and one user interface 112, any of the various implementations can include a greater or lesser number of robots 102, operator interfaces 104, computers 106, and user interfaces 112. Human operator 105 at operator interface 104 may interact computer system 100 to navigate a virtual environment (not shown).

Figure 2:
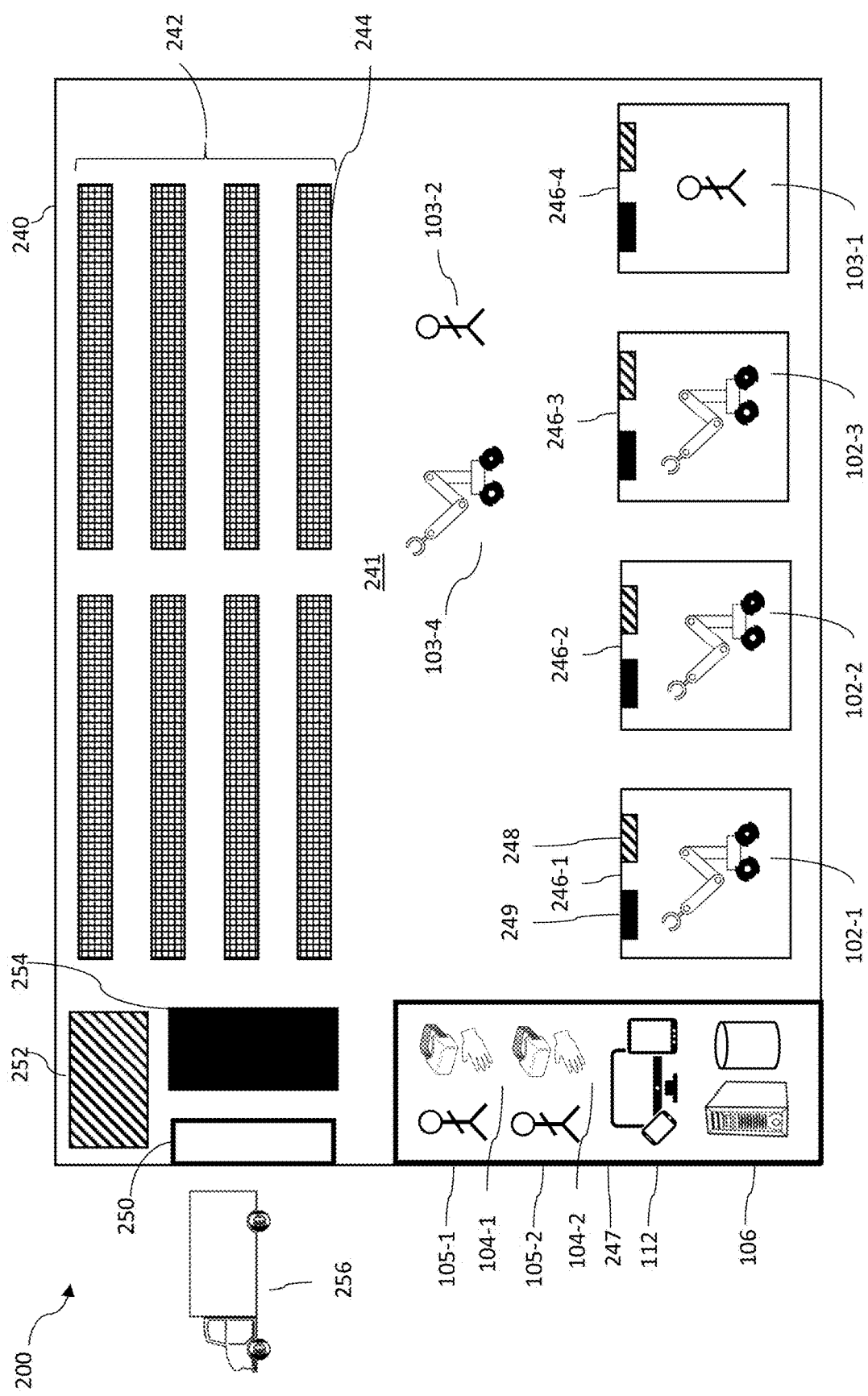
FIG. 2 is a schematic diagram illustrating a work environment.

FIG. 2 shows an exemplary warehouse environment 200 as an example of a workplace environment. Various components of warehouse environment 200 are optional. As shown, the warehouse environment 200 includes one or more robots 102-1, 102-2, 102-3, 102-4 (collectively 102), one or more operator interfaces 104-1, 104-2 (collectively 104), and one or more computers 106, in at least pairwise communication with each other via at least one communication channel(s) 108 (not shown in FIG. 2). The warehouse environment 200 may include a building envelope 240, a floor 241, and a storage area 242, including at least one shelving unit 244, rack, or other storage. The warehouse environment 200 may include one or more stations, e.g., station 246-1, station 246-2, station 246-3, and station 246-4 (collectively 246). While four stations 246 are illustrated, the warehouse environment 200 can include a greater or a fewer number of stations 246. One or more of the robots 102, e.g., robot 102-1, robot 102-2, and 102-3, and/or one or more human workers 103-1 may work in a station 246.

A station 246 may include an inbound area 248 and an outbound area 249. Inbound area 248 and outbound area 249 are called out only for station 246-1 in order to prevent cluttering the illustration. A robot, such as, robot 102-1, or a human worker, such as, worker 103-1, can work in a station 246. The robot 102 or worker 103 can pick orders, unpack returned orders, box orders, unbox returned orders, and the like. Thus, stations 246 may, for example, be a mix of zero or more picking stations, boxing stations, unboxing stations, unpacking stations, and the like.

Warehouse environment 200 may include an operator environment 247. The operator environment 247 may be within envelope 201, in a neighbouring building, or physically removed from and even distance to envelope 201. Operator environment 247 may include one or more human operators, e.g., 105-1, 105-2, who interact with one or more interfaces, e.g., operator interfaces 104-1, 104-2, and/or user interface devices 112. Operator environment 247 may include one or more computer(s) 106. The human operator 105 may pilot or operate robots 102. That is, robots 102 maybe operator controlled devices, piloted robots, or the like. One or more robots 102 may operate in response to and/or by executing instructions generated or principally generated at an operator interface, for example, operator interface 104-2. For example, a robot, in piloted mode, would execute instructions that cause the robot to simulate actions taken by a human operator at an operator interface. Robots 102 may operate in an autonomous mode executing autonomous control instructions. At least one processor generates processor executable instructions, which when executed, causes at least one of robots 102 to action, e.g., move, manipulate an item. Robots 102 may be selectively operable in an autonomous mode, or operable in a piloted mode by a human operator via an operator interface.

Robots 102 may operate in a hybrid manner where the robot is in piloted mode for one or more tasks in a pipeline of tasks and is in autonomous mode for one or more tasks in the pipeline. Control of a robot can pass from autonomous mode to piloted mode (or the reverse) during a pipeline of tasks. Examples of change of mode is illustrated and described herein in relation to, at least, FIG. 10.

The warehouse environment 200 may include an inbound area 252, for receiving items, and an outbound area 254, for dispatching items. These areas 252, 254 may be proximate to a loading bay, such as, loading bay or dock 250. The loading bay 250 may be used for loading and unloading vehicles, such as, a truck 256, or railcars or air or intermodal cargo containers.

One or more robots, e.g., robot 102-4, may travel across the floor 241. One or more workers, e.g., 103-2, may travel across the floor 241. Robot 102-4 or worker 103-2 may retrieve items from, or place items in, storage area 242. Items may move from the inbound area 252 to storage area 242, around or within storage area 242, from storage area 242 to stations 246, between and amongst stations 246, from stations 246 to outbound area 254, and the like.

Figure 3:
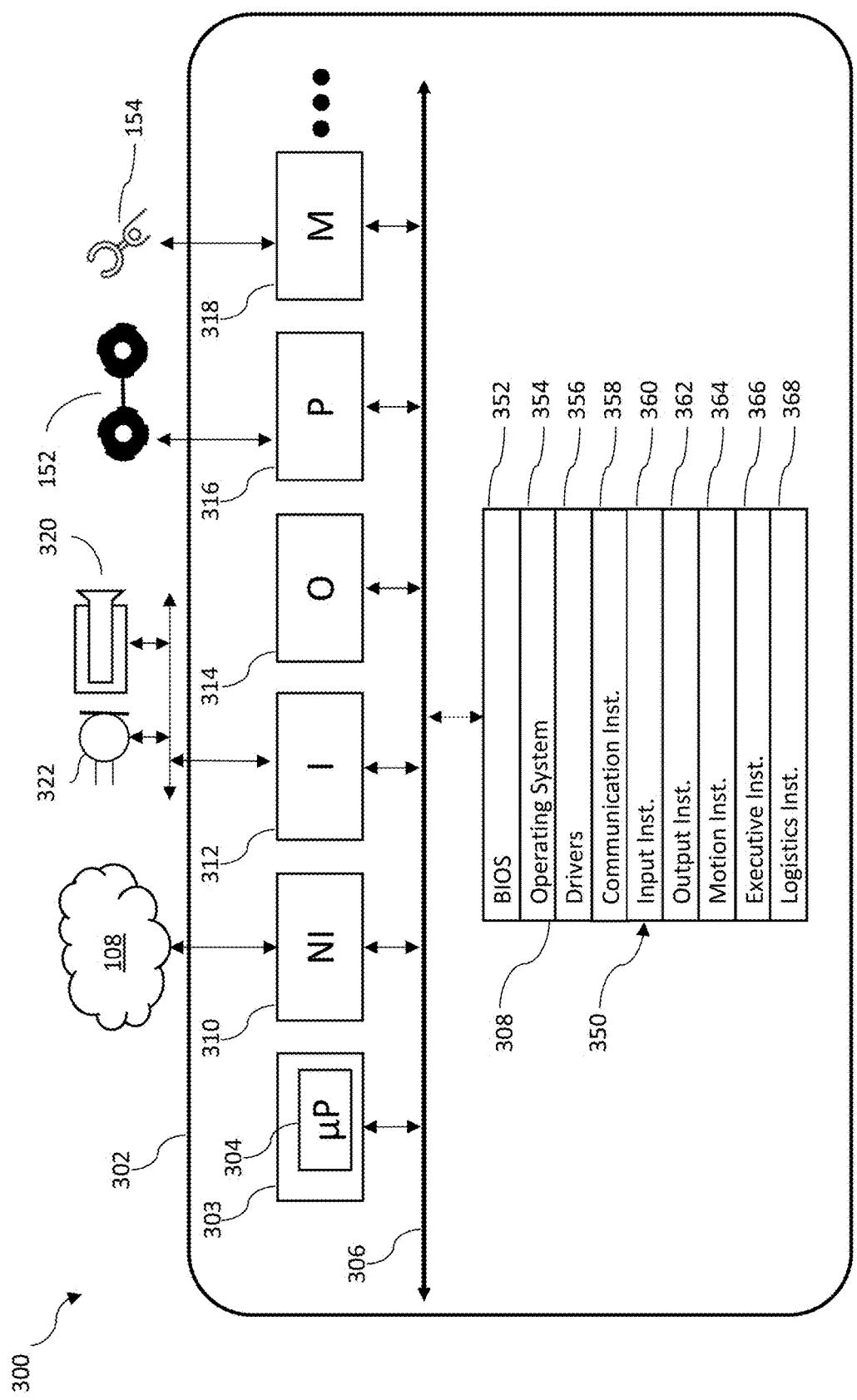
FIG. 3 is a schematic view illustrating an exemplary robot suitable for inclusion in the system of FIG. 1.

FIG. 3 illustrates an exemplary robot 300. As discussed herein, robots may take any of a wide variety of forms. FIG. 3 schematically shows parts of robot 300. Robot 300 includes at least one body 302, and a control subsystem 303 that includes at least one processor 304, at least one non-transitory computer- and processor-readable storage device 308, and at least one bus 306 to which the at least one processor 304 and the at least one nontransitory computer- or processor-readable storage device 308 are communicatively coupled.

The at least one processor 304 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. At least one processor 304 may be referred to herein by the singular, but may be two or more processors.

Robot 300 may include a network interface subsystem 310 communicatively coupled to the bus(es) 306 and provides bi-directional communicative coupling to other systems (e.g., external systems external to the robot 300) via a network or non-network communications channel, such as, network or non-network communications channel(s) 108. An example network is a wireless network. The network interface subsystem 310 may include one or more buffers. The network interface subsystem 310 receives and sends data for the robot 300.

The network interface subsystem 310 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, and the like. Suitable communication protocols include FTP, HTTP, Web Services, SOAP with XML, WI-FI™ compliant, BLUETOOTH™ compliant, cellular (e.g., GSM, CDMA), and the like. Suitable transportation protocols include TCP/IP, SCTP, and DCCP.

Robot 300 includes an input subsystem 312. In any of the implementations, the input subsystem 312 can include one or more sensors that measure conditions or states of robot 300, and/or conditions in the environment to robot 300. Such sensors include cameras or other imagers 320 (e.g., responsive in visible and/or nonvisible ranges of the electromagnetic spectrum including for instance infrared and ultraviolet), radars, sonars, touch sensors, pressure sensors, load cells, microphones 322, meteorological sensors, chemical sensors, or the like. Such sensors include internal sensors, pressure sensors, load cells, strain gauges, vibration sensors, microphones, ammeter, voltmeter, or the like. In some implementations, the input subsystem 312 includes receivers to receive position and/or orientation information. For example, a global position system (GPS) receiver to receive GPS data, two more time signals for the control subsystem 303 to create a position measurement based on data in the signals, such as, time of flight, signal strength, or other data to effect a position measurement. Also for example, one or more accelerometers can provide inertial or directional data in one, two, or three axes.

Robot 300 includes an output subsystem 314 comprising output devices, such as, speakers, lights, and displays. The input subsystem 312 and output subsystem 314, are communicatively coupled to the processor(s) 304 via the bus(es) 306.

Robot 300 includes a propulsion or motion subsystem 316 comprising motors, actuators, drivetrain, wheels, and the like to propel or move the robot 300 within a physical space and interact with it. The propulsion or motion subsystem 316 propulsion or motion subsystem comprises of one or more motors, solenoids or other actuators, and associated hardware (e.g., drivetrain, wheel(s), treads), to propel robot 300 in a physical space. For example, the propulsion or motion subsystem 316 includes wheels, drive train and motor 152. Propulsion subsystem 316 may move body 302 in an environment.

Robot 300 includes a manipulation subsystem 318, for example comprising one or more arms, end-effectors, associated motors, solenoids, other actuators, gears, linkages, drive-belts, and the like coupled and operable to cause the arm(s) and/or end-effector(s) to move within a range of motions. For example, the manipulation subsystem 318 includes an end-effector described in relation to arm and end-effector 154. The manipulation subsystem 318 is communicatively coupled to the processor(s) 304 via the bus(es) 306.

Components in robot 300 may be varied, combined, split, omitted, or the like. For example, robot 300 could include a pair of cameras (e.g., stereo pair) or a plurality of microphones. Robot 300 may include one, two, or three end-effectors or end of arm tools in manipulation subsystem 318. In some implementations, the bus(es) 306 is a plurality of buses (e.g., data buses, instruction buses, power buses) included in at least one body 302. For example, as part of a modular computing architecture where computational resources at distributed over the components of robot 300. That is in some implementations, a robot like robot 300, could have a processor in a left arm and a storage device in its thorax. In some implementations, computational resources are located in the interstitial spaces between structural or mechanical components of the robot 300. A data storage device could be in a leg and a separate data storage device in another limb. In some implementations, the computational resources distributed over the body include redundant computational resources.

The at least one storage device 308 is at least one nontransitory or tangible storage device. The storage device 308 can include two or more distinct non-transitory storage devices. The storage device(s) 308 can, for example, include one or more volatile storage devices, for instance random access memory (RAM), and/or one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), a hard disk drive (HDD), a network drive, flash memory, digital versatile disk (DVD), any other forms of computer- and processor-readable memory or storage medium, and/or a combination thereof. Storage can be read only or read-write as needed. Further, systems like system 100 can conflate volatile storage and non-volatile storage, for example, caching, using solid-state devices as hard drives, in-memory data processing, and the like.

The at least one storage device 308 includes or stores processor-executable instructions and/or processor-readable data 350 associated with the operation of robot 300, system 100, and the like.

The execution of the processor-executable instructions and/or data 350 cause the at least one processor 304 to carry out various methods and actions, for example via the motion or propulsion subsystem 316. The processor(s) 304 and/or control subsystem 303 can cause robot 300 to carry out various methods and actions including, receiving, transforming, and presenting information; moving in environment 140; manipulating items (e.g., objects); and acquiring data from sensors. Processor-executable instructions and/or data 350 can, for example, include a basic input/output system (BIOS) 352, an operating system 354, drivers 356, communication instructions and data 358, input instructions and data 360, output instructions and data 362, motion instructions and data 364, executive instructions and data 366, and logistics instructions and data 368.

Exemplary operating systems 354 include ANDROID®, LINUX®, and WINDOWS®. The drivers 356 include processor-executable instructions and data that allow control subsystem 303 to control circuitry of robot 300. The processor-executable communication instructions and data 358 include processor-executable instructions and data to implement communications between robot 300 and an operator interface, terminal, a computer, or the like. The processor-executable input instructions or data 360 guide robot 300 to process input from sensors in input subsystem 312. The processor-executable input instructions and data 360 implement, in part, the methods described herein. The processor-executable output instructions or data 362 guide robot 300 to provide information that represents, or produce control signal that transforms, information for display. The processor-executable motion instructions or data 364, which when executed cause the robot 300 to move in a physical space and/or manipulate one or more items. The processor-executable motion instructions and data 364 may guide the robot 300 in moving within its environment via components in propulsion or motion subsystem 316 and/or manipulation subsystem 318. The processor-executable executive instructions and data 366, when executed, guide the robot 300 the instant application or task for computer 106, system 100, or the like. The processor-executable executive instructions and data 366 guide the robot 300 in reasoning, problem solving, planning tasks, performing tasks, and the like.

Figure 4:
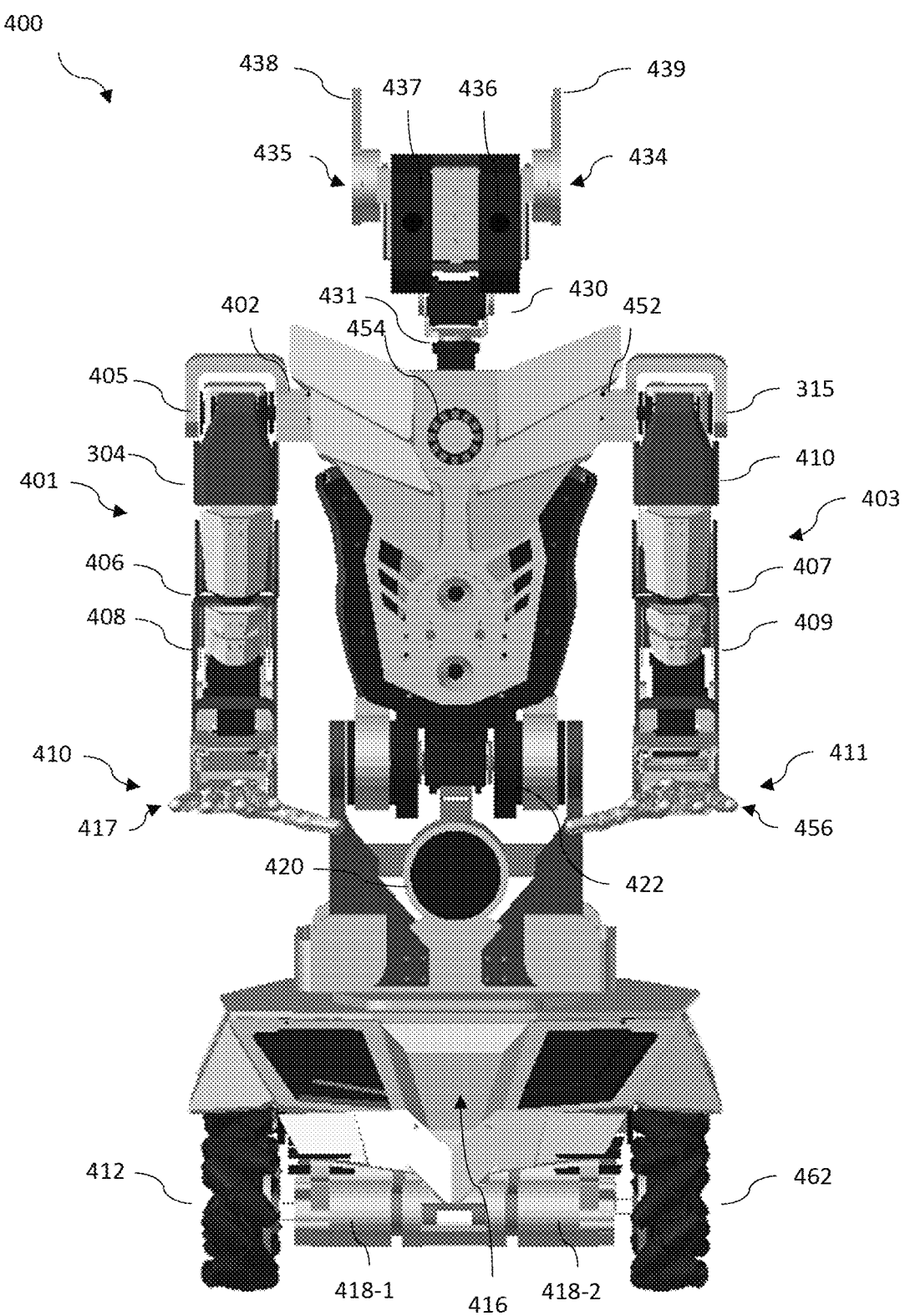
FIG. 4 is an elevation view illustrating an exemplary robot.

FIG. 4 illustrates an exemplary robot 400. As discussed herein, robots may take any of a wide variety of forms. These include human operator controllable robots, autonomous robots, and hybrid robotic robot. A robot comprises one or more bodies, also called structural components, or brackets. The bodies are coupled by joints, for example, bearings, and/or servo-motors. For example, a first body is connected to a second body by a servo or the like. It is possible to describe a robot in terms of the joints or the bodies. FIG. 4 is described in terms of the joints but a person of skill in the art will appreciate a body based description is possible.

Robot 400 may include a first arm 401 including one or more of shoulder servo 402, a shoulder servo 405, an elbow servo 406, a wrist servo 408, and end-effector 410. Robot 400 may include a second arm 403.

In various implementations, the shoulder servos 402 and 405 may control and sense roll and pitch respectively of a shoulder of a first arm 401 of the robot 400. In some implementations, the shoulder servos 402 and 405 may, for example be DYNAMIXEL™ MX-28, MX-64, or AX-12 servo-motors produced by Robotis Co. Ltd. of Seoul, SK, although other electric motors or other actuators can be employed.

In some implementations, the shoulder yaw servo 404 may control and sense the yaw of the first arm 401 of the robot 400. In various implementations, the shoulder yaw servo 404 may be a servo-motor like shoulder servos 402 and 405.

In some implementations, the elbow servo 406 may control and sense an elbow of the first arm 401. The elbow servo 406 may be a servo-motor like shoulder servos 402 and 405.

In some implementations, the first arm 401 includes a wrist servo 408 may control and sense rotation of an end-effector of the robot 400, e.g., end-effector 410. In some implementations, the wrist servo 408 maybe a servo-motor as described herein and including servos for shoulder servos 402 and 405.

In various implementations, the end-effector 410 may include a plurality of digits 417. For example, four fingers and a thumb are shown in FIG. 4. A thumb is generally regarded as a digit that may be used to oppose two more digits. In the case of an opposed pair of digits the thumb may be the short or less mobile digit. In some implementations, the digits of the end-effector 410 may include embedded force sensitive resistors. Respective servos, which may, for example be DYNAMIXEL™ XL-320 servo-motors or TOWERPRO™ hobby servos, may operate each digit independently. The end-effectors may, in some implementations, facilitate dexterous manipulation of items.

In some implementations, one or more digits of digits 417 of the end-effector 410 may have polymer filled internal and external structure and/or rubber pads proximate to the extremities of the one or more digits of digits 417. The material may, in operation enhance grip capacity of an end-effector and simulate the resistance of a human finger.

In some implementations, digits, such as digits 417, may each have one or more contact sensors and/or pressure sensors to sense pressure applied to the sensor and produce signals proportional to the pressure.

The second arm 403 is generally similar to the first arm 401 but mirrored across a central vertical or sagittal plane of the robot 400. Referring to FIG. 4, the second arm 403 includes a shoulder roll servo 452, a shoulder pitch servo 415, a shoulder yaw servo 413, an elbow servo 407, a wrist servo 409, and end-effector 411 including a plurality of digits 456.

In at least one implementation, the robot 400 includes one or more locomotion components comprising wheels, such as right wheel pair 412 and left wheel pair 462, an electronics compartment 416, DC motors 418-1 and 418-2, a speaker 420, a waist pitch servo(s) 422, an interlock 426 (to share torso support with waist pitch servo(s) 422), a single board computer (SBC) (not shown), one or more neck servos (e.g., two neck servos including a head pitch servo 430 and a head yaw servo 431), ear servos 434 and 435, cameras 436 and 437, microphones 438 and 439, lights/LEDs 454, and/or cable bundles (not shown).

In some implementations, wheel pair 412 and wheel pair 462 provide the capacity for locomotion to the robot 400. Wheel pairs 412 and 462 may provide a broad base which, in some examples, increases stability of the robot 400. In other implementations, one or more treads can provide locomotion.

In various implementations for example, one or more on-board power sources may be found in the compartment 416. The on-board power sources can, for example include one or more batteries, ultra-capacitors, fuel cells, to independently power different components of the robot 400. Servos can be on divided up over different batteries.

Exemplary batteries include secondary cells, for instance lithium polymer cells, for example, a 4000 mAh 3 cell 12 V battery; a 5 V 9600 mAh, USB mobile charging power pack; and a batter pack including one or more 3.7 V lithium ion batteries.

FIGS. 5A and 5B schematically show aspects and parts of operator interface 500 as an example of operator interface 104. FIG. 5A shows a front elevation view of the operator interface 500. FIG. 5B shows a side elevation view of the operator interface 500 shown in FIG. 5A. The operator interface 500 may include an operator interface processor, computer and processor readable storage device, display, potentiometers, speakers, a microphone, an inertial measurement unit ("IMU"), a haptic glove or manipulator interface, and an input/output ("I/O") interface, all of which are communicatively coupled to (e.g., in communication with) the operator interface processor. As discussed above, in various implementations an operator interface generally similar to the operator interface shown in FIGS. 5A and 5B may include fewer, additional, or alternative sensors, actuators, and/or output devices to those of the operator interface 500 shown in FIGS. 5A and 5B.

The operator interface 500 includes left/right audio output 502, a microphone 503, left/right visual display 504, a head/neck motion sensor 506, and first and second arm sensor assemblies 507 and 509.

The first arm sensor assembly 507 includes a shoulder roll servo 508, a shoulder pitch servo 511, an upper-arm rotation capture device 510, an elbow servo 512, a lower-arm rotation capture device 514, a forearm mount or strap 516, and a manipulator interface or haptic glove 518. The second arm sensor assembly 509 may be generally similar to the first arm sensor assembly 507 but mirrored across a central vertical or sagittal plane of the operator interface 500. The second arm sensor assembly 509 includes a shoulder roll servo 550, a shoulder pitch servo 552, an upper arm rotation capture device 554, an elbow servo 556, a lower arm rotation capture device 558, a forearm mount 560, and a manipulator interface or haptic glove 562.

Operator interface 500 includes a set of two or more locomotion pedals 520, such as, first, second, and third locomotion pedals 513, 515, and 517. The operator interface also includes a torso pitch interface 522 including an extension arm and a waist servo 525, a suit vest 524, an electronic back-box 526 and a chest/shoulder suit support structure 528.

In some implementations, the left/right audio output 502 (only one called out in Figures) may be implemented using speakers or headphones to provide an interface for receiving audio information from an operator controllable device, such as, one of robots 102, or robot 400, to an operator using operator interface 500. In some implementations, the microphone 503 provides an interface for sending audio to a human operator controllable robot or may be used to voice to command interface.

The left and right visual displays 504 may provide an interface for displaying visual information captured by cameras for the operator controllable device, e.g., cameras 436 and 437. In some implementations, other visual information may also or alternatively be generated for display on the left and right displays 504. An example of generated information which may be displayed on the left and right visual display 504 is battery charge levels of the operator controllable device. In some implementations, the generated information includes a metric for a robot as determined by one or more observers. The left and right visual display 504 can be implemented by a virtual reality headset, such as, an OCULUS RIFT™, or ALTERGAZE™, available, respectively, from Oculus VR of Menlo Park, Calif., US; and Altergaze Ltd of London, UK.

The head/neck motion sensor 506 senses or captures movement of an operator's head, specifically pitch and yaw. In one implementation, the head/neck motion sensor 506 may include a gyroscope, an accelerometer, a magnetometer, and/or another inertial measurement unit (IMU). In various implementations, the head/neck motion sensor 506 is part of, e.g., built into, a virtual reality headset.

In various implementations, the shoulder roll servo 508 and the shoulder pitch servo 511 may sense or capture roll and pitch positioning of an operator's shoulder. In some implementations, the servos may include feedback resistors or potentiometers that provide signals representing servo position measurements. In some implementations, the shoulder servos 508 and 511 sense or receive information about and then simulate or replicate positions of corresponding shoulder servos in a robot, e.g., servos 402 and 405 respectively. In some implementation, these servos 508 and 511 are DYNAMIXEL™ AX-12 servos, although are not limited to such.

Referring still to FIGS. 5A and 5B, in various implementations, the upper arm rotation capture device 510 may sense or capture rotation of an upper arm of an operator. In some implementations, the upper arm rotation capture device 510 includes a first semi-circular gear mechanism that curls or wraps around the upper arm and couples with a second semi-circular gear mechanism at about 90 degrees to the first. In some implementations, the first and second semi-circular gear mechanisms cooperatively transfer the rotation of the upper arm to the rotation of a potentiometer 570 to the second gear mechanism. The potentiometer 570 may be centered around the second gear mechanism.

In some implementations, a non-moving part of the potentiometer physically couples to the operator's shoulder. In at least one implementation, the potentiometer has a wider than normal central shaft with a hole in the center. In some implementations, the potentiometer is, for example, a 39/20 mm Center Space Rotary Potentiometer.

In some implementations, the elbow servo 512 may capture or sense an angle of an operator's elbow. For example, in at least one implementation, the elbow servo 512 is a DYNAMIXEL™ AX-12. In some implementations, the elbow servo 512 simulates or replicates positions of the elbow servo of an operator controllable device, e.g., servo 406.

In some implementations, the lower arm rotation capture device 514 may capture or sense the rotation of the lower arm of the operator. In some implementations, lower arm rotation capture device 514 may operate generally similarly to the upper arm rotation capture device 510. The lower arm rotation capture device 514 includes a semi-circular gear mechanism that wraps around the lower arm and couples with a second semi-circular gear mechanism at 90 degrees to the first. This gear arrangement may transfer the rotation of the lower arm to the rotation of a potentiometer 572 centered around and connected to the second gear mechanism. In various implementations, a non-moving part of a potentiometer may be fixed to the operator's arm. The potentiometer 572 may, for example, be a 39/20 mm center space rotary potentiometer from Panasonic Corp. of Osaka, JP, although other potentiometers can be employed.

In various embodiments, the forearm strap 516 may secure the first arm sensor assembly 507 of the operator interface 500 to the operator. In some implementations, the haptic glove 518 may capture or sense a position of the operator's pointer finger and thumb relative to one another. A servo 576 may be attached to the haptic glove 518 at the center point of rotation of the thumb and pointer finger of the operator. The angle of the servo may be controlled by two armatures 593 and 594 with rings allowing coupling of the operator fingers to the armatures. One armature is attached to the operator glove thumb 594 and the second armature is affixed to the operator glove pointer finger 593. In some implementations, the servo may be configured to provide feedback information garnered from an end-effector of the operator controllable device (e.g., robot 102) to the fingers of the operator using the operator interface 500 in the form of resistance as the operator guides the operator controllable device to pick up an item. In some implementations, the haptic glove 518 may use a DYNAMIXEL™ AX-12 servo.

The haptic glove 518 may have a vibrational device (e.g., vibrator) or buzzer 588, to vibrate with an amplitude or frequency that is a function of the signals coming from the finger pressure sensors of the haptic hand 510 of an operator controlled device, such as, robot 400. In some implementations, the amplitude or frequency may increase with increasing sensed pressure. The vibrational device 588 may be mounted on the back of the operator interface glove, or elsewhere on the haptic glove.

As discussed above, the second arm sensor assembly 509 mirrors and may be generally similar to the first arm sensor assembly 507. In some embodiments, the upper arm rotation capture device 554 includes a potentiometer 580, the lower arm rotation capture device 558 includes a potentiometer 582, and the haptic glove 562 includes a servo 584 and a left vibrational device or buzzer 590.

In some implementations, an operator controls the locomotion pedals 520. An operator generally will selectively use one or both feet to move the pedals. The locomotion pedals 520 are arranged and tuned such that angles sensed or captured by the pedals control the motors 418 of the robot 400 and thus control locomotion of the robot 400. In some implementations, left and right forward motion pedals 517 and 513 may operate independently to trigger left and right wheel pairs 462 and 412 respectively of the motility subsystem of the robot 400 and facilitate turning of the robot 400.

In some implementations, the locomotion pedals 520 may include a reverse motion pedal 515 configured to control both left and right wheels 462 and 412 shown in FIG. 4. The three pedals may be fixed to a single rubber mat to prevent movement or sliding during use. In some implementations, each of the locomotion pedals 520 includes a rotating, pivoting, or swinging foot platform, a potentiometer to capture the angle of the foot platform, and a spring to return the pedal to a neutral position when the operator's foot is removed. The spring from a domestic mousetrap provides sufficient restorative force for the purpose.

In some implementations, the locomotion pedals 520 may include a pedal for the left drive train, a pedal for the right drive train, and a pedal for reverse. In some implementations, the left and right drive train pedals may provide signals which are combined to calculate a rotational and linear velocity of the operator controllable device (e.g., robot 400).

In some implementations, a torso pitch interface 522 captures or senses how much an operator has bent forward by sensing the angle of the operator's torso relative to their hips or legs. An extension arm 586 on which a servo 525 is mounted may connect to the operator interface 500 by a hinge. In various embodiments, the extension arm may firmly connect to the operator's upper thigh. The waist servo 525 of the torso pitch interface 522 may, for example, be a DYNAMIXEL™ AX-12 servo.

In some implementations, the operator vest 524 may provide a mounting structure for components of the operator interface 500. The operator vest 524 may attach and anchor the operator interface 500 firmly to the operator's body.

In some implementations, the electronic back-box 526 may be attached to the vest 524 and may contain electronic components associated with the operator interface 500. In some implementations, the electronic back-box 526 may contain an ARDUINO PRO MINI™ which captures the sensor signals from the potentiometers 570, 572, 580, and 582 and controls mounted on the vest 524, power boards for the DYNAMIXEL™ bus, a power-breakout board which may also act as a patch panel including patching of the hand sensor signals and some ground pins, an ODROID™ which handles the wireless adapter for WIFI™ communication as well as a USB2AX, a Universal Serial Bus (USB) to Transistor-Transistor Interface (TTL) connector which allows the ODROID™ to send signals to the DYNAMIXEL™. The ODROID™ may also send signals to the ARDUINO PRO MINI™. The electronic back-box 526 may also contain an ARDUINO UNO™ configured to receive or capture position information from the pedals 520. Other computers, processors and/or boards may be employed. The ARDUINO PRO MINI™ microcontroller is available from Arduino LLC of Somerville, Mass., US. The ODROID™ computer, a processor-based device, is available from Hardkernel Co., Ltd. of Seoul, SK.

The chest/shoulder suit support structure 528 allows for suspension of operator interface suit items from the frame rather than from the operator's limbs. In various embodiments, the chest/shoulder suit support structure 528 may facilitate removal of the weight of the operator interface 500 off of the operator's arms onto the operators shoulder and back.

Figure 6A:
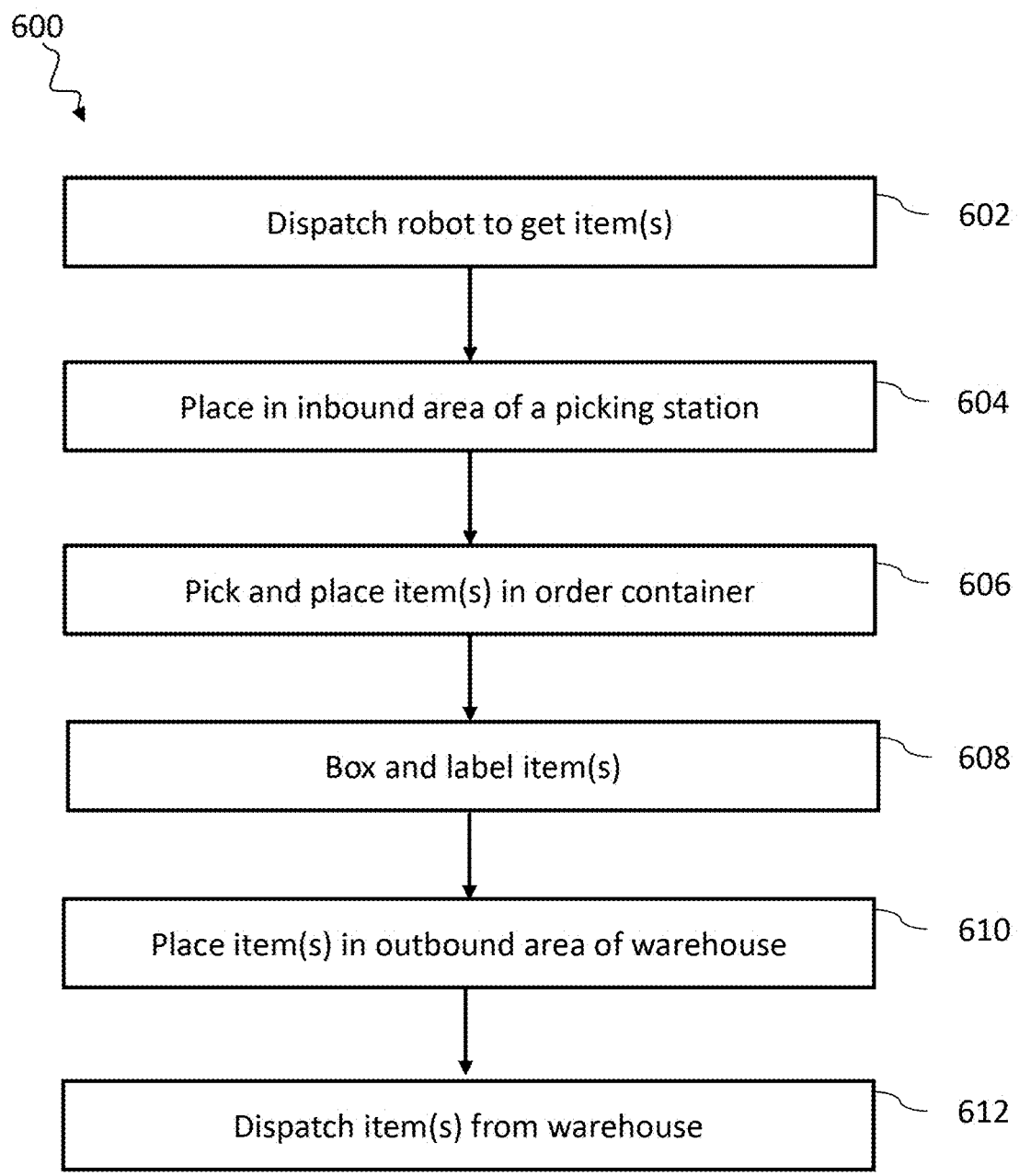
FIGS. 6A and 6B are flowcharts illustrating methods of operation in work environments.

FIG. 6A shows method 600 executable by a controller, such as circuitry or at least one hardware processor, for operation in a robotic system. Method 600 describes one way of picking items in a warehouse environment. Those of skill in the art will appreciate that other acts may be included, removed, and/or varied to accommodate alternative implementations. Method 600 is described as being performed by a controller, for example, a controller subsystem or processor(s) in computer system 106 in conjunction with other components, such as, components of system 100. However, method 600 may be performed by multiple controllers or by another system.

For performing part or all of method 600 the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. For performing part or all of method 600 one or more robots may be included in the operation of a robotic system. Exemplary robots are described herein.

Method 600 begins, for example, in response to an invocation by the controller. At 602, the controller dispatches a robot to get an item. For example, a controller causes a robot, such as, robot 102-4, to travel to storage area 242. The robot may, in response to the request from the controller, retrieve the item. In some implementations, the item is in tote or bin. In some implementations, the robot removes the item from a shelf or rack, and carries the item.

At 604, the controller directs or causes the robot to place the item at a picking station. For example, the inbound area 248 of picking station 246-1. At 606, the controller causes the robot to pick the item and place in an order container such as a box, tote, or tray.

The process of picking, order picking, order preparation, and the like, a process used in many work environments including logistics and warehouse environments, including environment 200. To pick an order is to gather, collect, or bring together items contained in the order. The order will specify the nature and quantity of items. The process involves an aspect of deciding upon which items to select to satisfy the nature and/or quantity of items specified in the order. The process may involve one or more of the tasks including locate, grasp, grip, release, and/or lift one or more items. The process can be part of a larger process or pipeline of processes, including: receive, pick, box, ship, and the like for an order.

At 608, the controller causes one or more robots to box the item and label the box. The one or more robots may be the robot in the picking station or at a separate boxing station. For example, 246-3 could be a picking station and 246-2 a boxing station.

At 610, the controller causes one or more robots to place the box in an outbound area of the warehouse. At 612, the items in the box are dispatched from the warehouse. The boxes could be loaded on a truck or other transport vessel or vehicle.

Figure 6B:
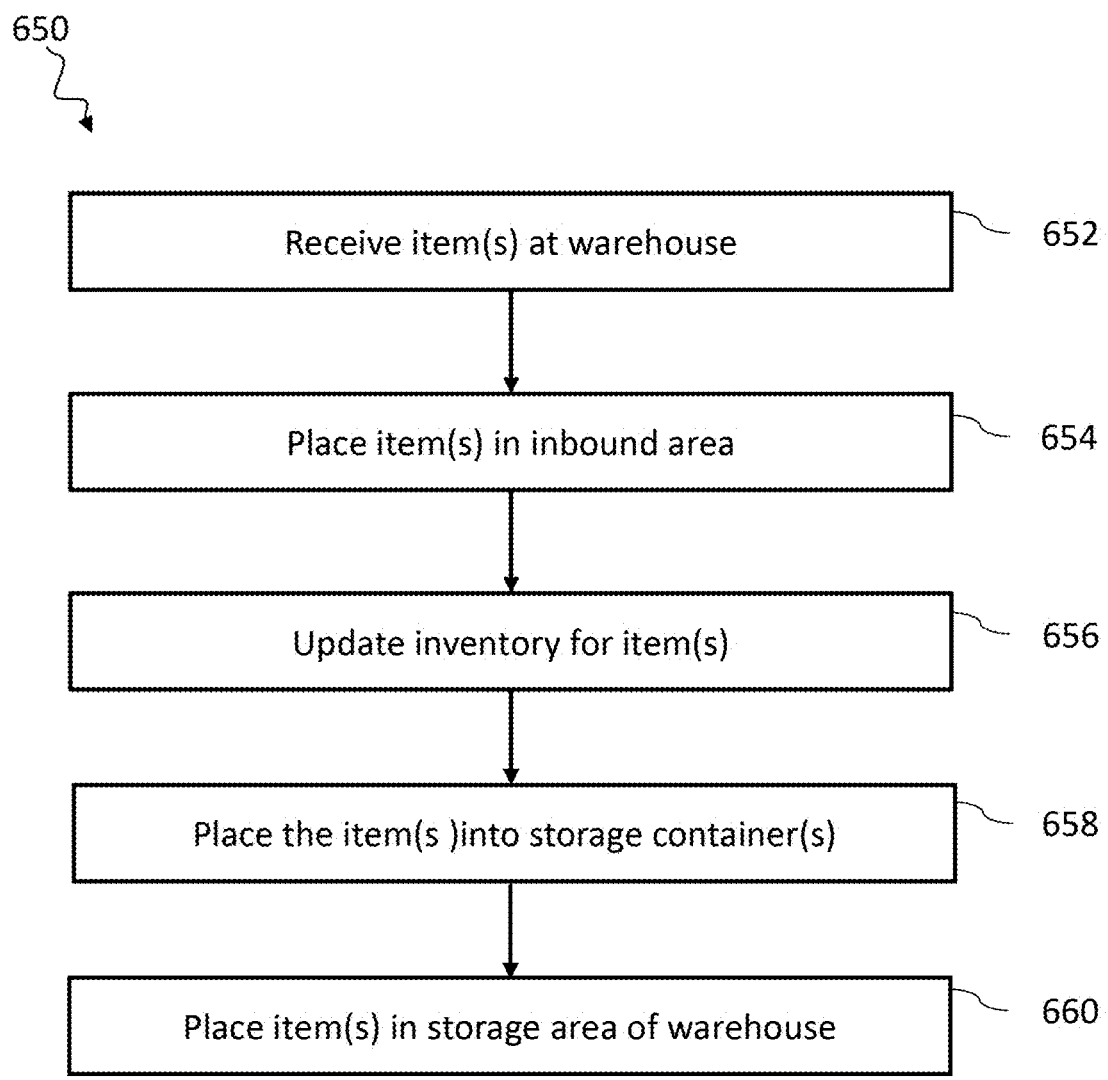

FIG. 6B shows method 650 executable by a controller, such as circuitry or at least one hardware processor, for operation in a robotic system. Method 650 describes an exemplary method to receiver items in a warehouse environment. Those of skill in the art will appreciate that other acts may be included, removed, and/or varied to accommodate alternative implementations. Method 650 is described as being performed by a controller, for example, a controller subsystem or processor(s) in computer system 106 in conjunction with other components, such as, components of system 100. However, method 600 may be performed by more than one controller or by another system.

Method 650 begins, for example, in response to an invocation by the controller. At 652, the controller directs a robot to receive one or more items at a warehouse. For example, move the items into a warehouse from a truck, such as, truck 256. The controller, at 654, causes the robot to place the one or more items in the inbound area of the warehouse where they are to be unpack, depalleted, and the like. The robot or additional robots may unpack the items.

At 656, the controller updates at least one computer readable storage medium containing inventory information to track the addition of the received items to inventory. At 658, the controller may cause one or more robots to place the items in one or more storage containers (e.g., bins). The controller, at 660, causes the robot to place the received items in a storage area, for example, storage area 242.

Figure 7:
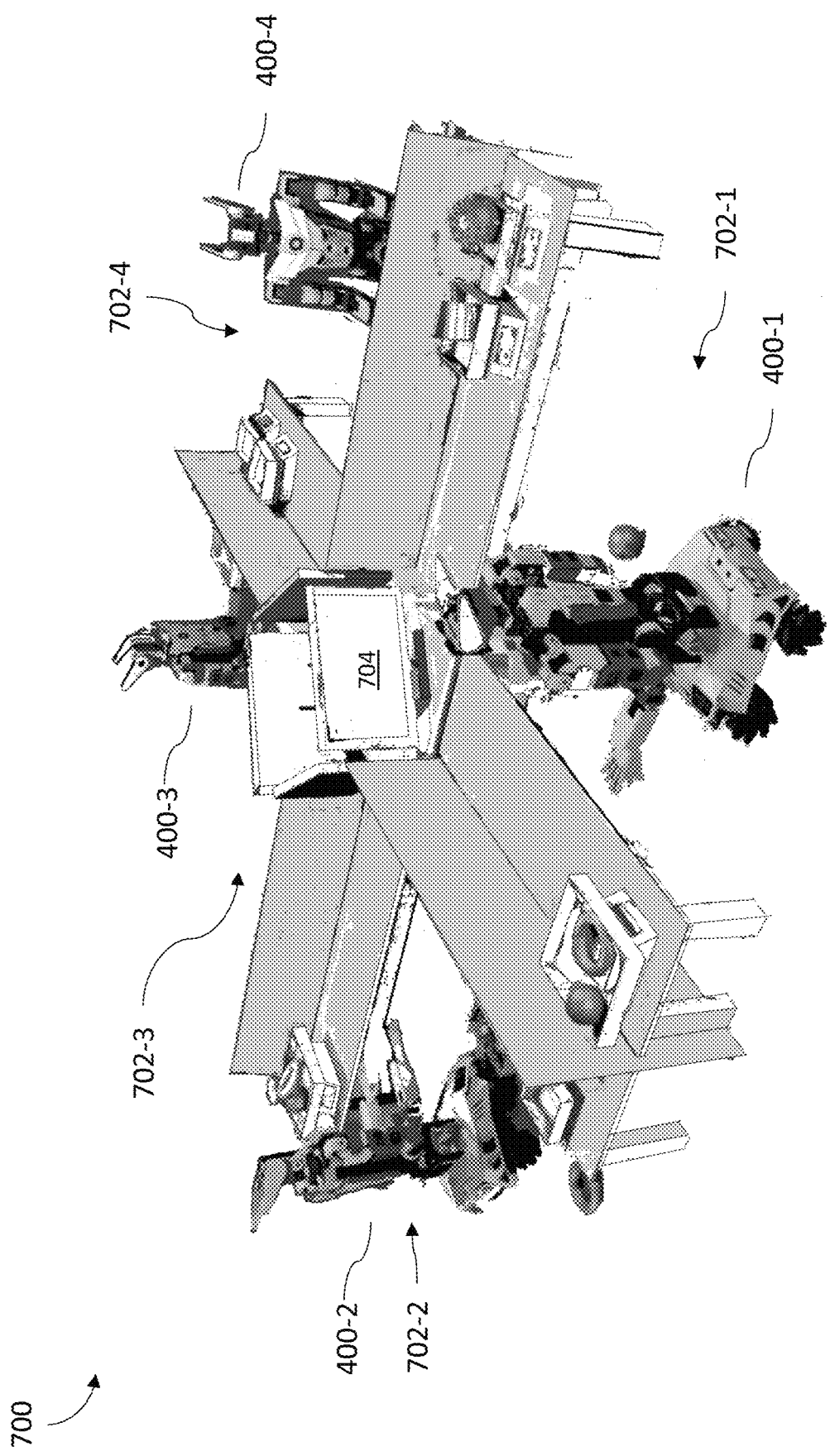
FIG. 7 is a perspective view illustrating a work station.

FIG. 7 illustrates a perspective view of plurality of work stations 700. Plurality of work stations 700 includes stations 702-1, 702-2, 702-3, and 702-4 (collectively 702). A station such as station 702-1, facilities picking of items for orders, boxing of picked items, or the like, so can be denominated as a picking station. As well, the stations 702 may be used for other tasks, such as, processing returns, inspecting orders or items, or the like.

Within each station 702 there may be one or more robots or workers. Four robots 400-1, 400-2, 400-3, and 400-4 (collectively 400) are shown. A robot 400, such as robot 400-1, may receive work instructions via a display or screen, for example via a centrally disposed display or screen 704. The work instructions can include picking instructions, boxing instructions, and the like. The work instructions can be displayed in human readable format (e.g., alphanumeric, graphical illustrations). The work instructions can specify one or more orders. Each order includes one or more items. Robots 400-1, 400-2, 400-3, and 400-4 may operate in piloted mode, or autonomous. That is, implement one or more tasks defined or in response to the work instructions autonomously and one or more tasks under human operator control.

Figure 8A:
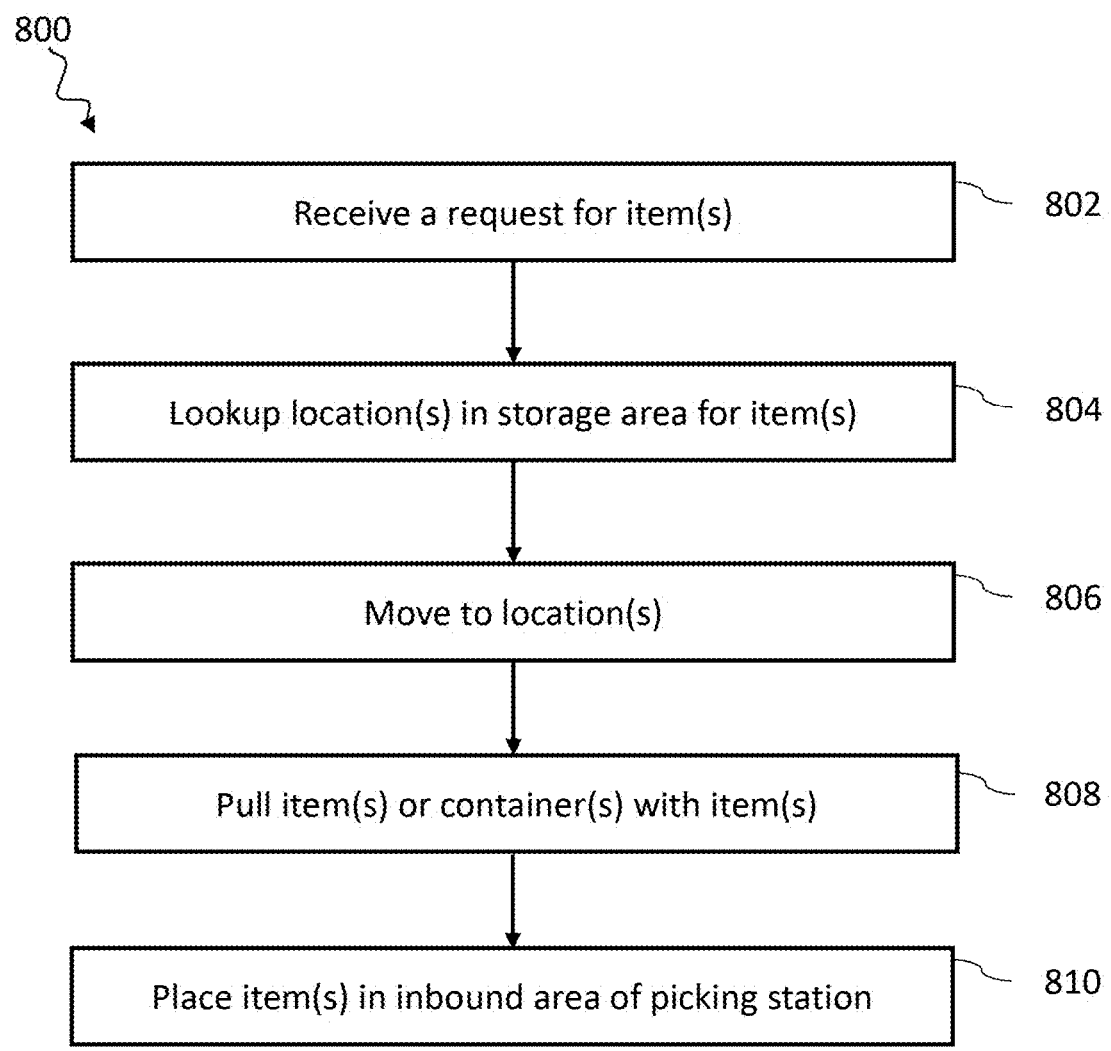
FIGS. 8A and 8B are flowcharts illustrating methods to pick items.

FIG. 8A is a flowchart illustrating a method 800 in a robotic system as part of performing a pipeline of tasks to pick one or more items for an order. Method 800 may be executed by controller, such as circuitry or at least one hardware processor, including those described herein. Method 800 describes one way of picking items in a warehouse environment. Those of skill in the art will appreciate that other acts may be included, removed, and/or varied to accommodate alternative implementations.

Method 800 begins, for example, in response to an invocation by the controller. At 802, the controller receives a request for one or more items in an order. At 804, the controller looks up one or more locations of the items in a storage area.

At 806, the controller directs or causes a first robot to move to one of the one or more items in storage and retrieve the one or more items. Without loss of generality method 800 can be described with respect to one location for the one or more items but the method equally applies with two or more locations, via further trips, legs of trips, and/or more robots. For example, the first robot may move in a first leg to a first location in a storage area retrieve one or more items, move to a second location on a second leg of the trip, and so on, until moving on a leg toward the picking station. Still at 806, the controller directs or causes the first robot to travel with the one or more items in the direction of a picking station.

A controller may direct the first robot. Examples of the first robot include pod fetcher robots that move items in a warehouse as stored in pods, mobile shelves, or other containers. Amazon Robotics LLC (previously Kiva Systems), of North Reading, Mass., US, makes pod fetcher robots that retrieve pods or mobile shelves from a storage area, such as, storage area 242. For example, a controller receives an order and causes a robot, such as, robot 102-4, to travel to storage area 242. The first robot returns with one or more storage totes, bins, pods, or containers, storing one or more items needed for an order.

At 808, the controller directs or causes the first robot to pull, grasp, lift, or carry the one or more items for the order from one or more locations in storage to the picking station. At 810, the controller causes the first robot to place or leave the one or more items in an inbound area of the picking station, for example, area 248 of station 246-1. The first robot can place the storage container, storing the one or more items, in the inbound area for the picking station.

The first robot may operate in piloted mode or in autonomous mode. For example, the first robot may be robot 102-4 controlled by operator 105-1 at operator interface 104-1 in operator environment 247. The first robot may move or act autonomously.

Figure 8B:
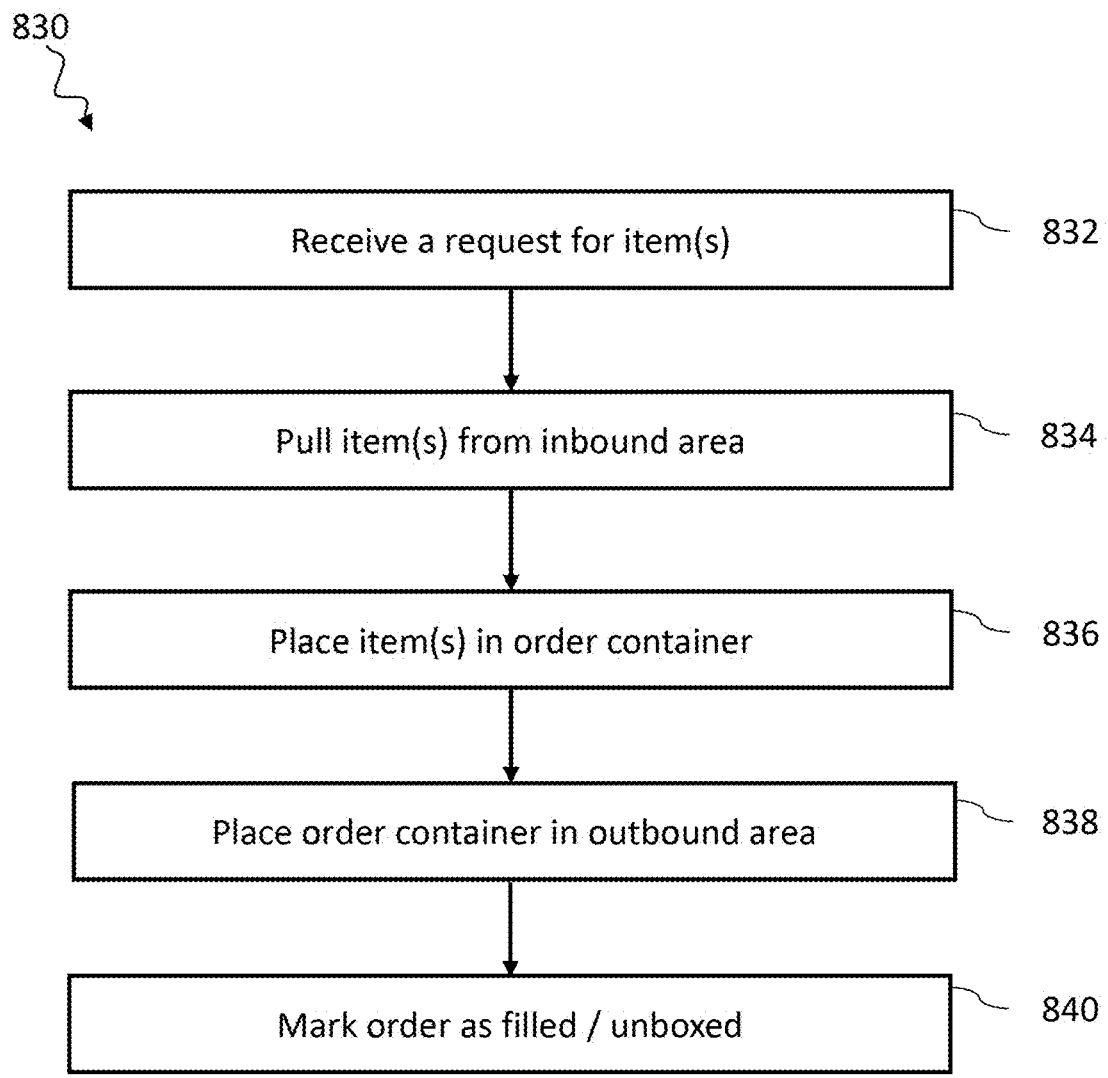

FIG. 8B is a flowchart illustrating a method 830 in a robotic system to pick items for an order. Method 830 may be executed by controller, such as circuitry or one or more hardware processors, including those described herein. Method 830 describes one way of picking items in a warehouse environment. Those of skill in the art will appreciate that other acts may be included, removed, and/or varied to accommodate alternative implementations.

Method 830 begins, for example, in response to an invocation by the controller. At 832, the controller receives a request for a second robot (e.g., robot 102-1) to pick one or more items for an order. The controller may cause a first robot to place one or more items for an order from an inbound area of a picking station. The controller and first robot may follow a method such as described in method 800. The one or more items may be in a storage container.

At 834, the controller directs or causes the second robot to pick one or more items for the order from the storage container. At 834, the controller may cause the second robot to perform a pipeline of tasks that may include one or more tasks selected from at least: identify the storage container, identify a part of the storage container, identify an item, isolate the item, examine the item, move relative to the item, plan movement or at least one grasp, grasp the item, move relative to the storage container, and release the item. In some implementations, at the end of 834 the second robot holds at least one of the one or more items.

At 836, the controller directs or causes the second robot to release, drop, or place the item in an order container or holder. The order container may be a package for shipping, for example, a box. The order container may be a tray, a tote, a bag, a bin, or the like. Act 834 and act 836 may be repeated for further items in the same order from the same or different storage container. These repetitions and variations of act 834 and act 836 are not illustrated to avoid obscuring the description.

At 838, the controller directs or causes the second robot to place the order container in an outbound area of the picking station. For example outbound area 249. The outbound area may be a shelf, a conveyor belts, a counter, or the like. At 840, the controller marks the order as picked (e.g., marks or sets a flag in memory or storage), or partially picked if items are not available, e.g., backorder. The controller may also mark the items as unboxed.

Figure 9:
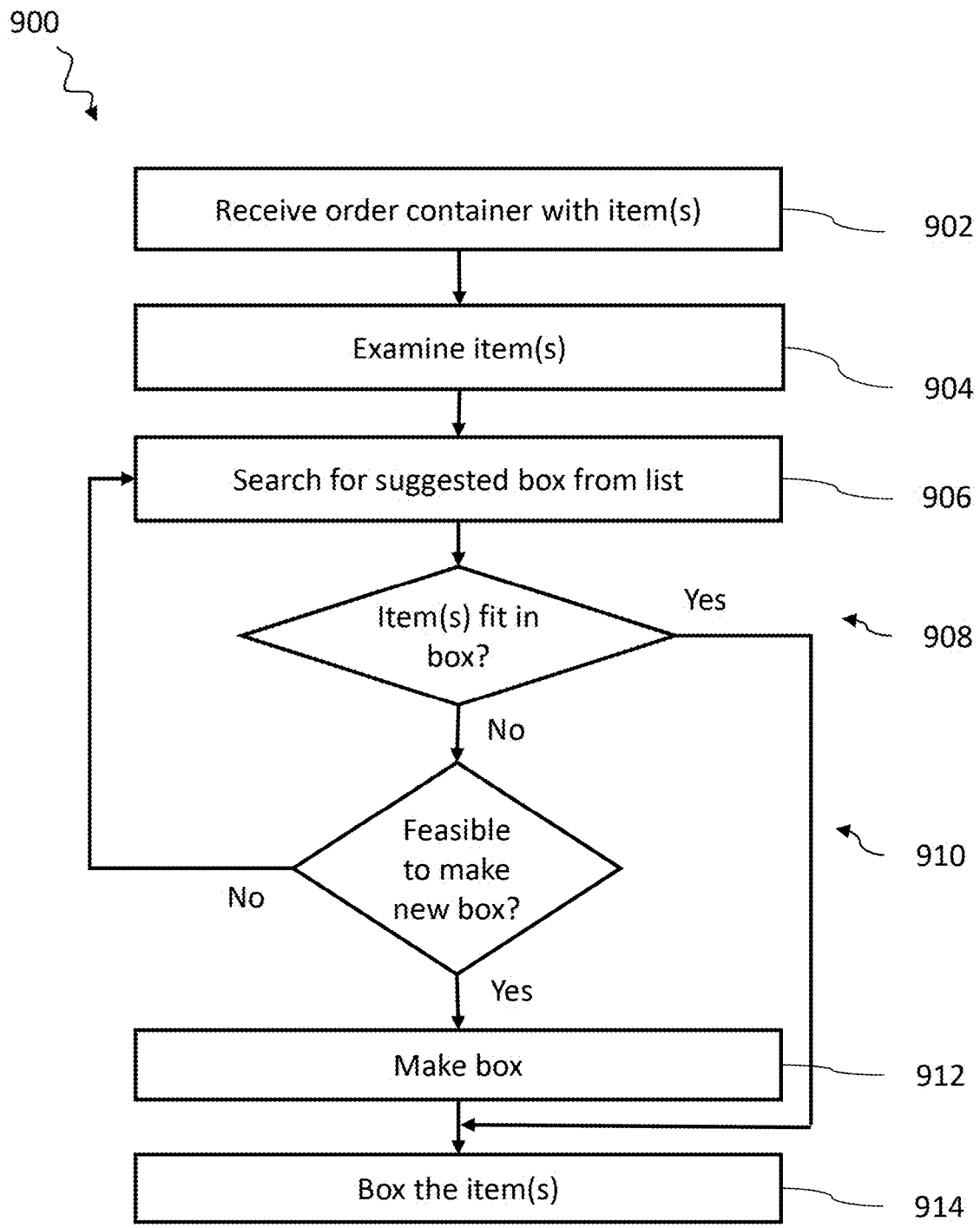
FIG. 9 is a flowchart illustrating an exemplary method for selecting a suitable box for one or more items.

FIG. 9 is a flowchart illustrating a method 900 in a robotic system including an automated box maker. Method 900 may be executed by controller, such as circuitry or at least one hardware processor, including those described herein. Method 900 describes one way to box items in a warehouse environment. Those of skill in the art will appreciate that other acts may be included, removed, and/or varied to accommodate alternative implementations.

Method 900 begins, for example, in response to an invocation by the controller. At 902, the robot receives an order container or holder. At 904, the robot examines the items in or on the order container or holder. For example, the robot looks at the items, and removes the items form the order container. The robot could spin or rotate the items. The robot extracts the dimensions of the items for the order. For example, using knowledge of position of the term and stereoscopic vision. The robot can, for more than one item, aggregate the dimensions of the items where the aggregation corresponds to a packing arrangement.

At 906, the controller searches for a suitable box given the aggregate dimensions. For example, the controller could look up the interior dimensions of a selection of available boxes.

At 908, the robot test fits the items in a box allowing for specified clearances and packing material. For example, the controller determines if the dimensions of the box and the aggregate dimensions align or correspond given specified tolerance and available packing material, e.g., closed inflated polyethylene cells. Or, for example, the robot test packs the items into the box following specified tolerance and using available material.

If the items fit in the box, 908—Yes, then processing continues at act 914. At 914, the robot seals, and optionally labels. The box can be placed, by the robot, in the outbound area of a station.

If the one or more items do not fit in the box, 908—No, then processing continues at act 910. At 910, the robot derives a result as to whether it is feasible to make a new box. For example, is there another available box that may be shipped for the same rate? Or is the cost to make the new box less than savings in shipping of a larger box? Can the box maker make a box big enough for the one or more items? If it is not feasible, 910—No, processing continues at 906 search for a larger suggested box. If it is feasible, 910—Yes, processing continues at act 912. At 912, the robot creates a new box. For example, the robot can interact with a custom box maker. A box can be made from a web of cardboard that is scored (for latter folding), cut, folded, and fastened. The web is extruded, cut, folded, and fastened, for example, glued. This creates a flattened box that can be folded by the robot. The custom box maker can be an automated box forming machine.

Figure 10:
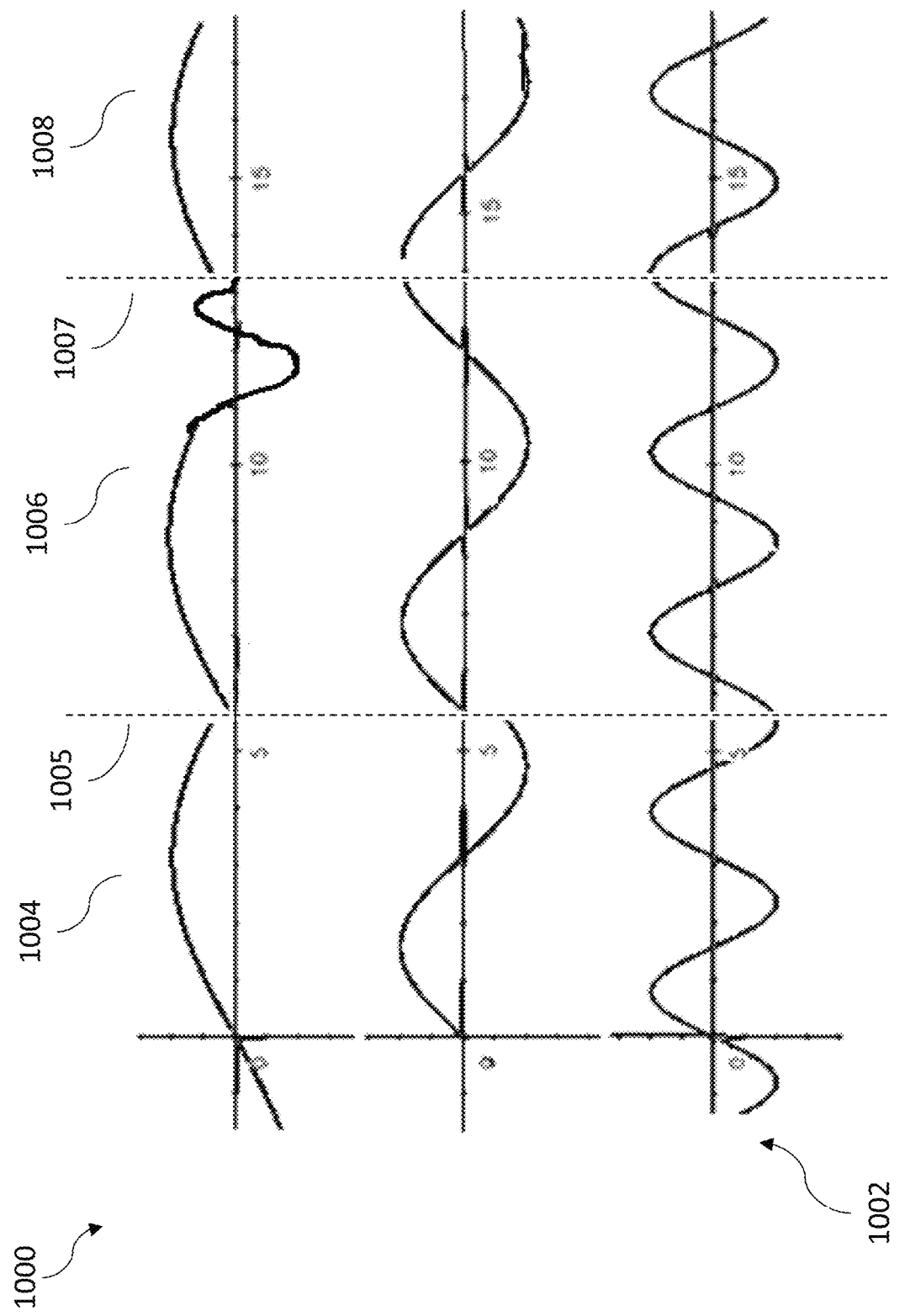
FIG. 10 is a graph showing line plots schematically illustrating hybrid control of a robot device.

FIG. 10 is graph showing a line plot 1000 illustrating hybrid control of a robot. A robot may be selectively operable in an autonomous mode and operable in a piloted mode. For example, robot 400 may move from autonomous control to operator control and then to autonomous control. Line plot 1000 includes a plurality of control signals 1002. For example, signals produced or generated by a processor on board a robot. Each signal could correspond to a servo in the robot. In period 1004, the signals could be generated in response to the execution of autonomous control instructions. Time 1005, may be a transition from autonomous control to operator control. Period 1006 may be a period of operator control. In period 1006, signals 1002 may correspond to signals generated by robot control instructions defined, or defined in part, by a human operator at an operator interface. Robot control instructions are processor executable instructions which when executed by a processor or control subsystem cause a robot to move, manipulate, At time 1007, the robot can move from an operator controlled mode to an autonomous mode for period 1008. Methods to handle requests for operator control are described herein at least in relation to FIG. 11. Methods to create requests for operator control are described herein at least in relation to FIG. 12.

Figure 11:
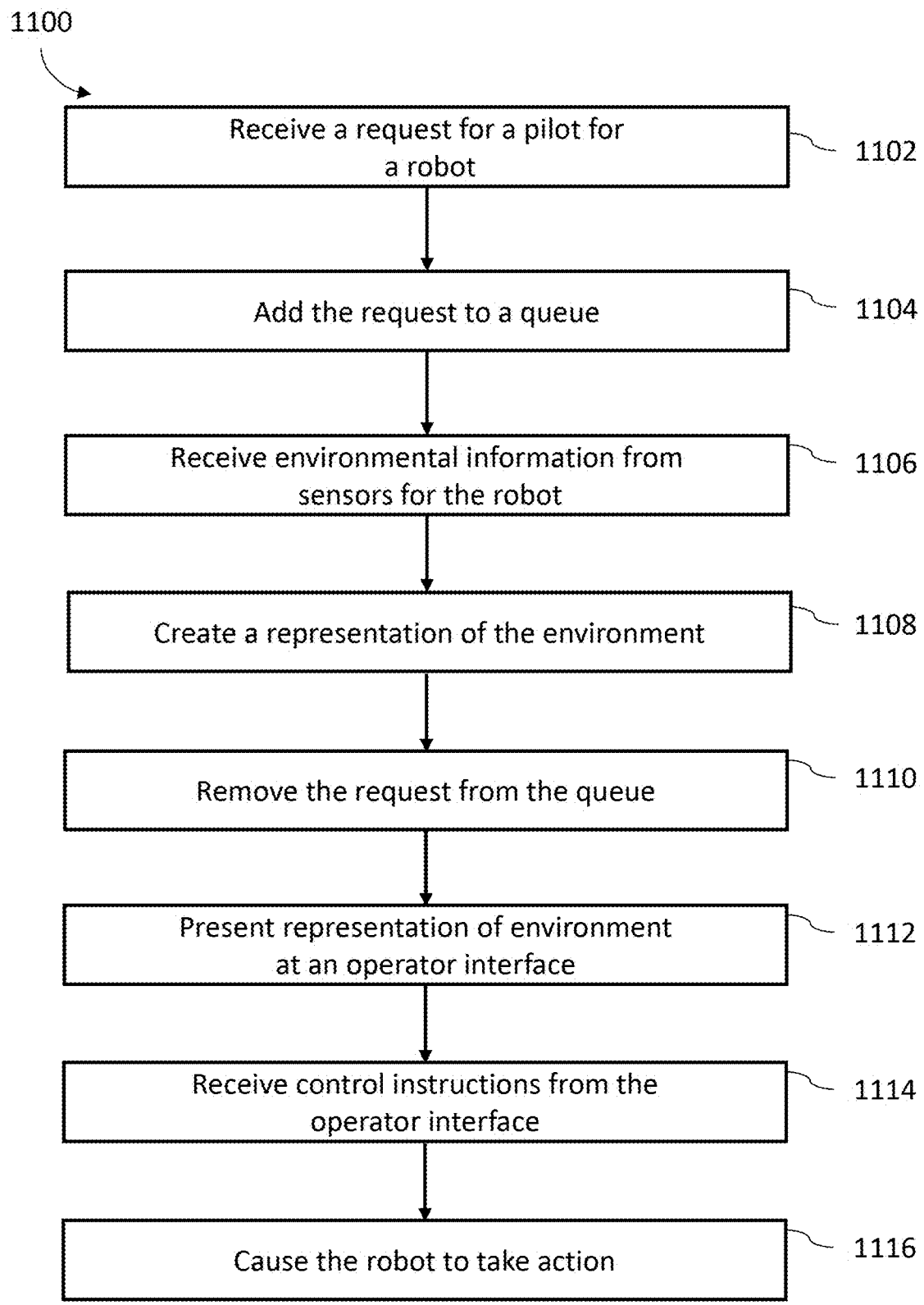
FIG. 11 is a flowchart illustrating an exemplary method for processing requests for a pilot from one or more robots.

FIG. 11 is a flowchart illustrating a method 1100 for the operation of a robotic system in which a plurality of robots generates a plurality of requests for a pilot. Method 1100 may be executed by controller, such as circuitry or at least one hardware processor, including those described herein. Method 1100 describes one way, when executed by the controller, to manage requests for a pilot (i.e., human operator). Those of skill in the art will appreciate that other acts may be included, removed, and/or varied to accommodate alternative implementations.

Method 1100 begins, for example, in response to an invocation by the controller. At 1102, the controller receives a request from robot, e.g., robot 102-1. A request includes information that represents an inquiry for a human operator to complete one or more tasks in a pipeline of one or more tasks. For example, a robot acting autonomously could have failed to complete task and requests that a human operator complete the task. Or, a robot, acting autonomously, could determine it is likely to fail at a task. For example, a processor or a control subsystem could assess the ability of the robot to complete one or more tasks in the pipeline. A negative assessment could be the robot is unable or is likely unable to complete the one or more tasks in the pipeline. A negative assessment could be the robot is able or is likely able to complete the one or more tasks in the pipeline. In some implementations, the assessment includes a probability component.

At 1104, the controller, adds the request to a data structure for requests, e.g., a queue. In some implementations, the data structure is a First In First Out (FIFO) queue. In a FIFO queue requests are processed in the order in which they arrive. In some implementations, the controller maintains a plurality of queues. For example, one queue for tasks of anticipated short duration, and at least one other queue for tasks with longer anticipated durations. In some implementations, the queue is a prioritized queue in which requests are added in, and thus removed, according to priority and time of request.

At 1106, the controller receives or acquires environment sensor data or information from one or more sensors on a robot. For example, a robot can send environment sensor information along with the request for a human operator, or at later time. The robot has the ability to acquire information from one or more sensors including on-board and/or remote sensor. The data includes information about the conditions for the environment associated with the robot, for example, environment 140, environment 200, and station 702. Examples of environment sensor information include video, audio or haptic data received from one or more environmental sensors on the robot. Examples of sensors include cameras, radars, sonars, touch sensors, and the like, and includes examples described herein at least in relation to FIGS. 1, 3, and 4.

At 1108, the controller creates a representation of the environment of the robot. For example, the controller uses part of the environment sensor data to generate images, sounds from the environment, a map of the environment, or the like. The human operator may observe representations of sensor data—for example, video, audio or haptic data received from one or more environmental sensors or internal sensor. The human operator may then act, conditioned by a perception of the representation of the data, and to create information or executable instructions to direct the robot. Act 1108 may occur after act 1110.

At 1110, the controller removes a request from the data structure for requests, e.g., queue. For example, the controller removes the request at the head of queue. In a FIFO queue this is the request that has been pending for the longest period.

At 1112, the controller may cause the representation of the environment to be displayed at an operator interface, such as, operator interface 104, 500, or the like. The human operator may assess the representation of the environment and complete the task. For example, the operator at the operator interface may assume a pose corresponding to the robot's present pose and then provide input indicating readiness to assume control of the robot. For example, the operator interface may receive a voice command. That is, the operator, or pilot, may say "oh boy" and then simulate one or more motions for the robot to replicate in analogous motion. The operator would complete the task specified in the request and receive an indication of success and/or automatically leap out of one robot into another robot with a pending request in the queue. In some implementations, a human operator completes one or more tasks in succession for one robot, e.g., one or more tasks in a pipeline of tasks. In some implementations, the operator at the operator interface may assume an initial pose corresponding to an initial pose for the robot. That is, prior to a switch from autonomous to piloted mode the robot moves to an initial pose.

At 1114, the controller receives robot control instructions from the operator interface. The robot control instructions, when executed by a robot, e.g., when executed by a control subsystem, causes the robot to simulate at least one action taken by a human operator in response to the representation of the environment.

At 1116, the controller causes the robot to execute the robot control instructions. For example, the processor sends the robot control instructions to the robot, and the robot executes the robot control instructions causing the robot to take action. For example, a control subsystem for the robot executes the robot control instructions.

The operator or pilot may upon completion of the task terminate control of the robot and allow the robot to carry on performing in a pipeline of tasks by the execution of autonomous robot control instructions. That is, have the robot act autonomously.

Method 1100 ends until invoked again. Method 1100 may further include the controller making one or more updates to at least one tangible computer readable storage medium, such as, storage 110, with processor readable information that represents or more of the following data: request, information about the robot, information about the operator interface, the environmental sensor data, and the robot control instructions. The processor readable information may be processed, e.g., processed off-line by computer 106, to create autonomous control instructions or information. Autonomous control information could include a probability distribution over a plurality of actions conditioned on observations of an environment.

Figure 12:
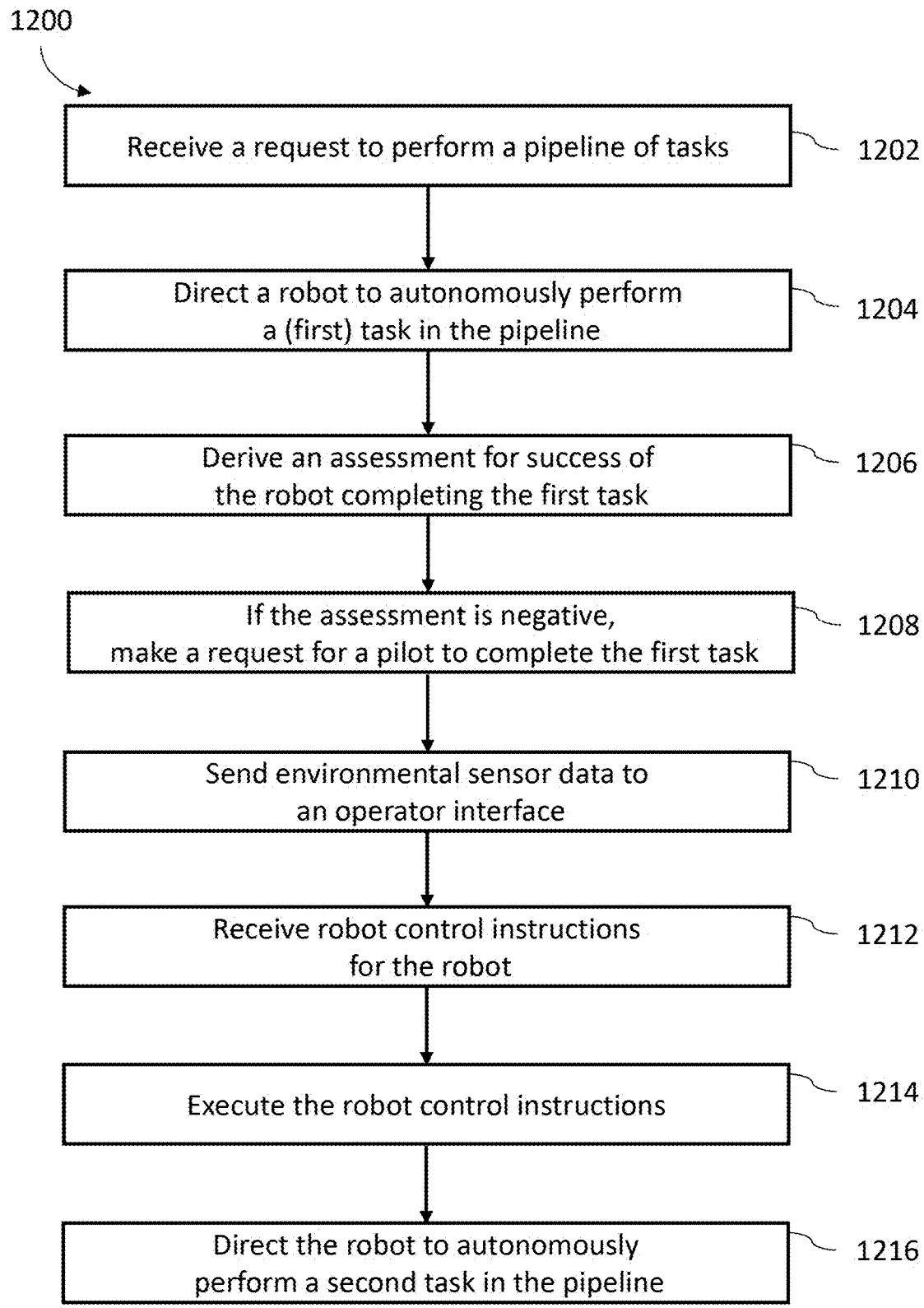
FIG. 12 is a flowchart illustrating an exemplary method for hybrid operation.

FIG. 12 is a flowchart illustrating a method 1200 for a robotic system including a robot. Method 1200 may be executed by controller, such as circuitry or at least one hardware processor, including those described herein, such as, control subsystem 303. Method 1200 describes one way for a robot to request assistance form a human operator or pilot. Those of skill in the art will appreciate that other acts may be included, removed, and/or varied to accommodate alternative implementations.

Method 1200 begins, for example, in response to an invocation by a controller. At 1202, the controller receives a request for a robot to perform one or more tasks. The one or more tasks may include a pipeline of tasks that lead to a shared objective.

At 1204, the controller directs the robot to autonomously perform the one or more tasks. For example, the controller directs device robot, such as, robot 400, to perform a first task in a pipeline of tasks.

At 1206, the controller assess the ability of the robot to complete one or more tasks in the pipeline. A negative assessment could mean the robot is unable, or is likely unable, to complete the one or more tasks in the pipeline. A negative assessment could be the robot is, or is likely, able to complete the one or more tasks in the pipeline. The assessment could be a predictive assessment. The assessment could include a record of failure at perform a task.

For example, the controller derives a probability of completion of the one or more tasks. For example, the controller derives a probability of completion of the next task in the one or more tasks, e.g., the first task in the pipeline of tasks.

At 1208, if the controller determines negative assessment for completion of the next task, the controller sends a request for an operator at an operator interface perform the next task (i.e., act as a pilot). For example, the controller determines a probability for completion is below a defined or selected threshold. For example, a request for piloted mode is generated and sent to computer 106 for operator 105 to pilot the robot. That is, use the robot as operator controllable device.

At 1210, the controller causes the robot to send environmental sensor data or information that represents the environment of the robot. For example, the environmental sensor data could include video data. Examples of environmental sensor data and the sensors that generate the data are described herein at least in relation to FIGS. 1, 3, and 4. Act 1210 may be time separated from act 1208.

At 1212, the controller receives robot control instructions, generated at the operator interface, which when executed by the robot cause the robot to perform the first task in the pipeline of tasks. At 1214, the controller executes the robot control instructions.

At 1214, the controller directs the robot to autonomously perform the act after the next act in the one or more tasks.

Method 1200 ends until invoked again. Method 1200 may further include the controller making an update to at least one tangible computer readable storage medium, such as storage device(s) 110, with processor readable information that represents or more of the following data: request, information about the robot, information about the operator interface, the environmental sensor data, and the robot control instructions. The processor readable information may be processed, e.g., processed off-line by computer 106, to create autonomous control instructions or information. Autonomous control information could include a probability distribution over a plurality of actions conditioned on observations of an environment.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or virtually any combination thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure. For example, those skilled in the relevant art can readily create source code based on the methods described herein including methods shown in FIGS. 8A, 8B, 9, 11, and 12.

As used herein processor-executable instructions and/or data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a robotic system including at least one robot that is selectively operable in an autonomous mode and operable in a piloted mode by a human operator via an operator interface operator, at least one processor in communication with the robot, and in communication with the operator interface, the method comprising:

receiving, by the at least one processor, a request to process a pipeline of tasks including a plurality of tasks;

assessing, by the at least one processor, an ability to complete one of the plurality of tasks prior to the robot attempting the one of the plurality of tasks;

in response to a positive assessment of the ability to complete the one of the plurality of tasks, performing the one of the plurality of tasks by the robot without human intervention;

assessing, by the at least one processor, an ability to complete an other one of the plurality of tasks;

in response to a negative assessment of the ability to complete the other one of the plurality of tasks, requesting, by the at least one processor, a pilot to operate the robot for the other one of the plurality of the tasks; and performing the other one of the plurality of the tasks under guidance of a human operator based at least in part on instructions received from the human operator via an operator interface.

2. The method of claim 1 wherein the plurality of tasks comprises:

gripping, by the robot, an item.

3. The method of claim 1 wherein the plurality of tasks comprises a task selected from the group consisting of:

identifying an item;
releasing an item; and
placing an item in an order container.

4. The method of claim 1 wherein performing the task by the robot without human intervention further comprises:

executing, one or more times, by the robot, autonomous control instructions which when executed by the robot causes the robot to autonomously perform the one of the plurality of tasks.

5. The method of claim 4 further comprising:

producing, by the robot, data that represents non-completion of the one of the plurality of tasks; and including, by the at least one processor, the data that represents the non-completion of the one of the plurality of tasks in the assessment of completion of the one of the plurality of tasks.

6. The method of claim 1 further comprising:

creating, by the at least one processor, a motion plan for the robot to autonomously perform the one of the plurality of tasks in the pipeline of tasks; and deriving, by the at least one processor, a probability of completion of the one of the plurality of tasks from the motion plan.

7. The method of claim 1, wherein:

requesting the pilot to operate the robot for the other one of the plurality of the tasks occurs before performing the one of the plurality of tasks by the robot without human intervention.

8. The method of claim 1 further comprising:

producing, by the robot, environmental sensor data that represents an environment of the robot; and updating, by the at least one processor, at least one tangible computer readable storage medium with processor readable information that represents one or more of:

the environmental sensor data,
the other one of the plurality of tasks, and
the instructions received from the human operator via an operator interface.

9. A method of operation in a robotic system including a robot, at least one processor in communication with the robot, and an operator interface in communication with the robot and the at least one processor, the method comprising:

receiving, by the at least one processor, a request to process a pipeline of tasks;

directing, by the at least one processor, the robot to autonomously perform a first task in the pipeline of tasks;

deriving, by the at least one processor, an assessment of completion of the first task prior to attempting the first task;

as a result of the assessment of completion of the first task being negative, requesting, by the at least one processor, an operator at an operator interface perform the first task;

sending, from the robot, environmental sensor data that represents the environment of the robot; and receiving, at the robot, device control instructions, generated at the operator interface, which when executed by the robot, causes the robot to perform the first task in the pipeline of tasks.

10. The method of claim 9 wherein the first task in the pipeline of tasks further comprises:

gripping, by the robot, an item.

11. The method of claim 9 wherein the first task in the pipeline of tasks further comprises a task selected from the group consisting of:

identifying an item;
releasing an item; and
placing an item in an order container.

12. The method of claim 9 wherein directing the robot to autonomously perform the first task in the pipeline of tasks further comprises:

executing, by the robot, autonomous control instructions, which when executed by the robot causes the robot to autonomously perform the first task in the pipeline of tasks.

13. The method of claim 12, further comprising:

producing, by the robot, data that represents non-completion of the first task; and including, by the at least one processor, the data that represents the non-completion of the first task in the assessment of completion of the first task.

14. The method of claim 9, further comprising:

creating, by the robot, a motion plan for the robot to autonomously perform the first task in the pipeline of tasks; and deriving, by the robot, the assessment of completion of the first task from the motion plan.

15. The method of claim 14 wherein:

deriving the assessment of completion of the first task from the motion plan further comprises deriving, by the at least one processor, a probability for completion of the first task; and the assessment of completion of the first task is negative as a result of the probability of completion of the first task being below a defined threshold.

16. The method of claim 9, further comprising:

directing, by the at least one processor, the robot to autonomously perform a second task in the pipeline of tasks.

17. The method of claim 9, further comprising:

updating, by the at least one processor, at least one tangible computer readable storage medium with at least one processor readable information that represents the environmental sensor data, and the device control instructions.

18. A system, comprising:
a robot;
at least one processor configured to communicate with the robot; and
memory storing instructions that, as a result of execution by the at least one processor, causes the system to:
   receive, by the at least one processor, a request to process a pipeline of tasks including a plurality of tasks;
   assess, by the at least one processor, an ability to complete one of the plurality of tasks prior to the robot attempting the one of the plurality of tasks;
   perform, in response to a positive assessment of the ability to complete the one of the plurality of tasks, the one of the plurality of tasks by the robot without human intervention;
   assess, by the at least one processor, an ability to complete an other one of the plurality of tasks;
   request, by the at least one processor in response to a negative assessment of the ability to complete the other one of the plurality of tasks, a pilot to operate the robot for the other one of the plurality of the tasks; and
   perform the other one of the plurality of the tasks under guidance of a human operator based at least in part on instructions from the human operator.

19. The system of claim 18 wherein execution of the instructions causes the system to:
   create, by the at least one processor, a motion plan for the robot to autonomously perform the one of the plurality of tasks in the pipeline of tasks; and
   derive, by the at least one processor, a probability of completion of the one of the plurality of tasks from the motion plan.

20. The system of claim 18, wherein execution of the instructions causes the system to:
   receive, by the at least one processor, environmental sensor data generated by the robot that represents an environment of the robot; and
   update, by the at least one processor, information stored in the memory that represents one or more of:
      the environmental sensor data,
      the other one of the plurality of tasks, and
      the instructions received from the human operator via an operator interface.

* * * * *